US009827614B2

(12) United States Patent
Chen et al.

(10) Patent No.: US 9,827,614 B2
(45) Date of Patent: Nov. 28, 2017

(54) CUTTING TOOL ASSEMBLY HAVING CLAMP ASSEMBLY COMPRISING A CLAMP AND A COOLANT PLATE

(71) Applicant: Kennametal Inc., Latrobe, PA (US)

(72) Inventors: Shi Chen, Huntingdon, PA (US); Nicholas J. Henry, Greensburg, PA (US); Kent P. Mizgalski, Stahlstown, PA (US); Samuel L. Eichelberger, Trafford, PA (US)

(73) Assignee: KENNAMETAL INC, Latrobe, PA (US)

( * ) Notice: Subject to any disclaimer, the term of this patent is extended or adjusted under 35 U.S.C. 154(b) by 0 days.

(21) Appl. No.: 15/141,935

(22) Filed: Apr. 29, 2016

(65) Prior Publication Data

US 2016/0271704 A1    Sep. 22, 2016

Related U.S. Application Data

(63) Continuation of application No. 13/918,192, filed on Jun. 14, 2013, now Pat. No. 9,511,421.

(51) Int. Cl.
| | |
|---|---|
| *B23B 27/10* | (2006.01) |
| *B23B 27/16* | (2006.01) |
| *B23B 29/04* | (2006.01) |

(52) U.S. Cl.
CPC .......... *B23B 27/10* (2013.01); *B23B 27/1677* (2013.01); *B23B 2205/00* (2013.01);
(Continued)

(58) Field of Classification Search
CPC . B23B 2250/12; B23B 2260/03; B23B 27/10; B23B 27/1677; B23B 27/1666; B23C 5/28
See application file for complete search history.

(56) References Cited

U.S. PATENT DOCUMENTS

| | | | |
|---|---|---|---|
| 2,992,472 A | 7/1961 | Mercer | |
| 3,084,416 A | 4/1963 | Broughton | |
| (Continued) | | | |

FOREIGN PATENT DOCUMENTS

| | | |
|---|---|---|
| DE | 3740814 A1 | 6/1989 |
| JP | 52011493 A | 1/1977 |
| (Continued) | | |

OTHER PUBLICATIONS

Machine Shop Practice, Industrial Press Inc. New York, New York (1981) pp. 199-204.
(Continued)

*Primary Examiner* — Sara Addisu
(74) *Attorney, Agent, or Firm* — Matthew S. Bedsole

(57) ABSTRACT

A clamp assembly to secure a cutting insert to a holder that includes a clamp that has a distal end and a clamp projection depending from the distal end of the clamp. There is a coolant plate that has a top plate surface and a bottom plate surface wherein the top plate surface contains a recess that receives the clamp projection upon assembly of the clamp and the coolant plate. The bottom plate surface contains a bowl having an open bowl end wherein in operation the bowl directs coolant through the open bowl end toward the cutting insert. The assembly has a positioner extending between the clamp and the coolant plate so as to maintain a position of the clamp relative to the coolant plate upon the assembly of the clamp and the coolant plate.

9 Claims, 22 Drawing Sheets

(52) U.S. Cl.
CPC ....... *B23B 2250/12* (2013.01); *B23B 2260/03* (2013.01); *Y10T 407/14* (2015.01)

(56) References Cited

U.S. PATENT DOCUMENTS

| | | | |
|---|---|---|---|
| 3,102,326 A | | 9/1963 | Conti |
| 3,132,542 A | * | 5/1964 | Horvath ................ B23B 27/007 407/106 |
| 3,191,262 A | | 6/1965 | Wallace et al. |
| 3,205,557 A | | 9/1965 | Frommelt |
| 3,303,553 A | | 2/1967 | Severson |
| 3,466,721 A | * | 9/1969 | Binns ................. B23B 27/1666 407/70 |
| 3,497,935 A | | 3/1970 | Bowling |
| 3,500,523 A | | 3/1970 | Cashman |
| 3,688,366 A | | 9/1972 | Jones |
| 3,731,356 A | | 5/1973 | Gowanlock |
| 3,754,309 A | | 8/1973 | Jones |
| 3,887,974 A | | 6/1975 | Sorice |
| 3,911,543 A | | 10/1975 | Sorice |
| 3,934,320 A | | 1/1976 | McCreery |
| 3,939,539 A | | 2/1976 | Novak |
| 4,057,884 A | | 11/1977 | Suzuki |
| 4,118,138 A | | 10/1978 | Takacs |
| 4,321,846 A | | 3/1982 | Neamtu |
| 4,400,117 A | | 8/1983 | Smith |
| 4,480,950 A | * | 11/1984 | Kraft ................... B23B 27/1651 407/103 |
| 4,535,216 A | | 8/1985 | Cassidenti |
| 4,545,705 A | | 10/1985 | Benson |
| 4,600,341 A | | 7/1986 | Board |
| 4,697,963 A | * | 10/1987 | Luck .................. B23B 27/1651 407/105 |
| 4,946,319 A | | 8/1990 | Lyon |
| 5,022,795 A | | 6/1991 | Stampfli |
| 5,100,269 A | | 3/1992 | Lyon |
| 5,538,367 A | | 7/1996 | Ashley |
| 5,658,100 A | | 8/1997 | Deiss |
| 5,709,907 A | | 1/1998 | Battaglia et al. |
| 5,722,803 A | | 3/1998 | Battaglia et al. |
| 5,820,311 A | | 10/1998 | Grun |
| 5,836,723 A | | 11/1998 | Von Haas |
| 5,868,530 A | | 2/1999 | Shouse |
| 5,901,623 A | | 5/1999 | Hong |
| 5,904,452 A | | 5/1999 | Kress |
| 5,915,889 A | | 6/1999 | Kress |
| 6,000,885 A | | 12/1999 | Erickson |
| 6,017,172 A | | 1/2000 | Ukegawa |
| 6,045,300 A | * | 4/2000 | Antoun ................. B23B 27/10 407/11 |
| 6,053,669 A | | 4/2000 | Lagerberg |
| 6,161,990 A | | 12/2000 | Oles et al. |
| 6,176,649 B1 | * | 1/2001 | Friedman ............... B23B 27/04 407/110 |
| 6,186,704 B1 | | 2/2001 | Hale |
| 6,196,774 B1 | | 3/2001 | Minshall |
| 6,299,388 B1 | | 10/2001 | Slabe |
| 6,379,087 B1 | | 4/2002 | Alexander |
| 6,682,273 B2 | * | 1/2004 | Sjoo .................. B23B 27/1633 407/103 |
| 7,073,986 B2 | * | 7/2006 | Andras ................. B23B 27/1651 407/113 |
| 7,128,501 B1 | | 10/2006 | Sipos |
| 7,246,974 B2 | | 7/2007 | Hansson |
| 7,261,496 B2 | | 8/2007 | Zitlaff |
| 7,313,991 B2 | | 1/2008 | Penkert |
| 7,510,352 B2 | | 3/2009 | Craig |
| 7,611,310 B2 | * | 11/2009 | Isaksson ............... B23B 27/065 407/11 |
| 7,883,299 B2 | | 2/2011 | Prichard |
| 8,215,878 B2 | | 7/2012 | Rozzi |
| 8,256,998 B2 | | 9/2012 | Prichard et al. |
| 8,596,935 B2 | * | 12/2013 | Fang .................... B23B 27/007 407/11 |
| 8,827,599 B2 | * | 9/2014 | Henry .................. B23B 27/10 407/11 |
| 9,016,985 B2 | | 4/2015 | Amor |
| RE45,536 E | | 6/2015 | Andras |
| 9,101,985 B2 | * | 8/2015 | Chen ................... B23B 27/10 |
| 9,227,248 B2 | * | 1/2016 | Eder ................... B23B 27/1629 |
| 9,511,421 B2 | * | 12/2016 | Chen ................... B23B 27/1677 |
| 2003/0082018 A1 | | 5/2003 | Kraemer |
| 2003/0086766 A1 | | 5/2003 | Andras |
| 2004/0240949 A1 | | 12/2004 | Pachao-Morbitzer et al. |
| 2004/0256608 A1 | | 12/2004 | Eder |
| 2005/0186039 A1 | | 8/2005 | Muller |
| 2006/0018723 A1 | | 1/2006 | Sjoo |
| 2006/0053987 A1 | | 3/2006 | Ghosh |
| 2006/0263153 A1 | | 11/2006 | Isaksson |
| 2007/0245535 A1 | | 10/2007 | Noggle |
| 2007/0283794 A1 | | 12/2007 | Glannetti |
| 2008/0175678 A1 | | 7/2008 | Prichard |
| 2009/0320655 A1 | * | 12/2009 | Grant ................... B23B 27/10 82/50 |
| 2010/0254772 A1 | * | 10/2010 | Rozzi .................. B23B 27/10 407/11 |
| 2011/0020073 A1 | | 1/2011 | Chen |
| 2011/0299944 A1 | | 12/2011 | Hofermann |
| 2013/0051934 A1 | | 2/2013 | Henry |
| 2013/0078043 A1 | * | 3/2013 | Henry ................. B23B 27/1622 407/11 |
| 2014/0161547 A1 | * | 6/2014 | Kaufmann ........... B23B 27/1666 407/72 |
| 2014/0169890 A1 | * | 6/2014 | Chen .................. B23Q 11/1023 407/11 |

FOREIGN PATENT DOCUMENTS

| | | |
|---|---|---|
| JP | 62297044 A | 12/1987 |
| JP | 2002346810 A | 12/2002 |
| JP | 2006055917 A | 3/2006 |
| JP | 2013146819 A | 8/2013 |
| WO | 9939853 A1 | 8/1999 |

OTHER PUBLICATIONS

ASTE Tool Engineers Handbook, McGraw Hill Book Co., New York, New York (1949) pp. 302-315.

* cited by examiner

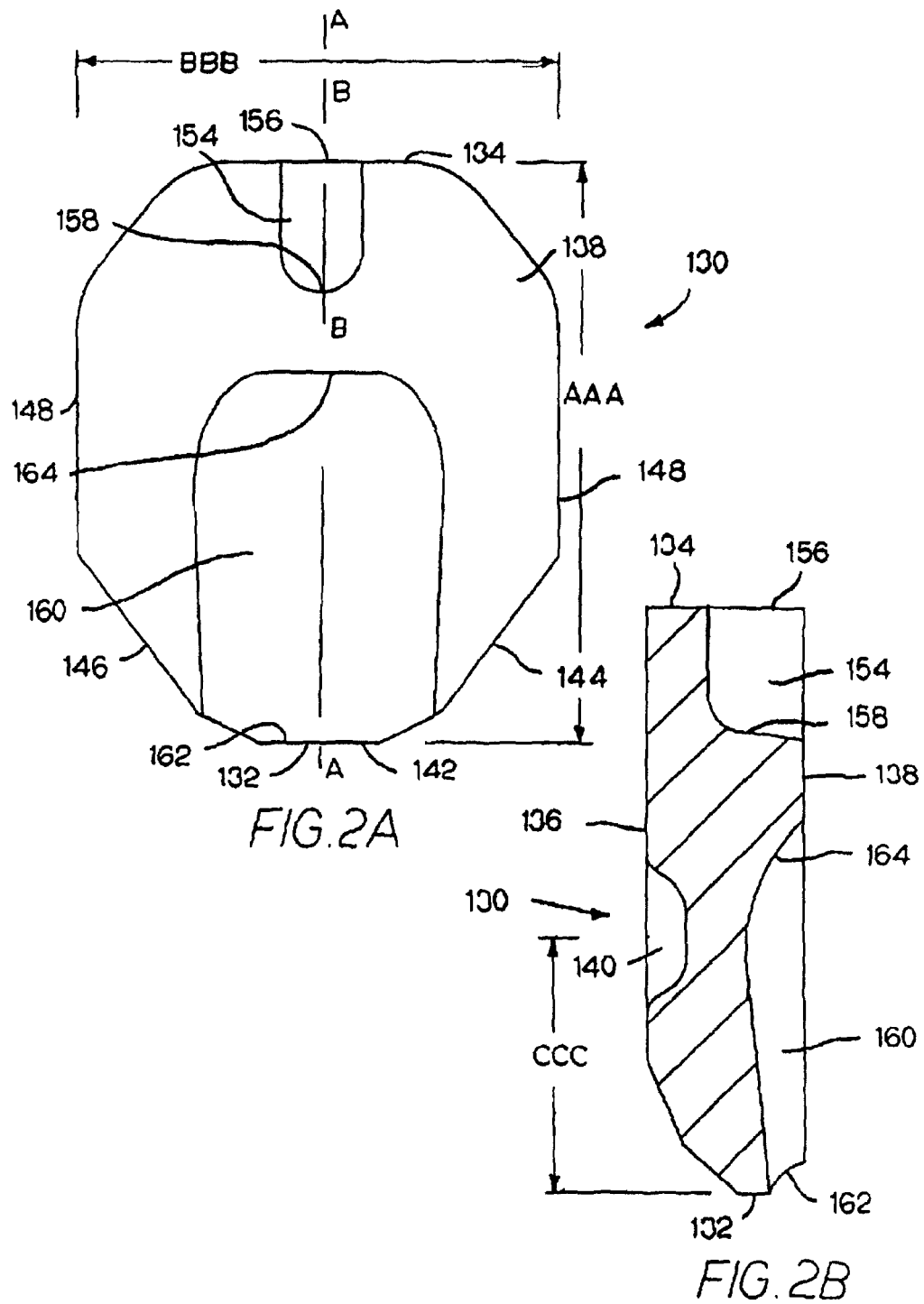

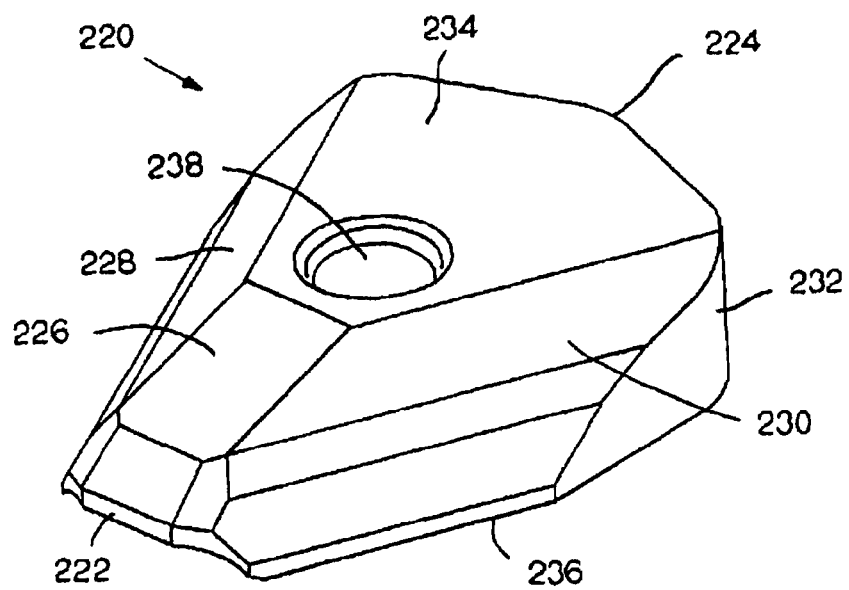
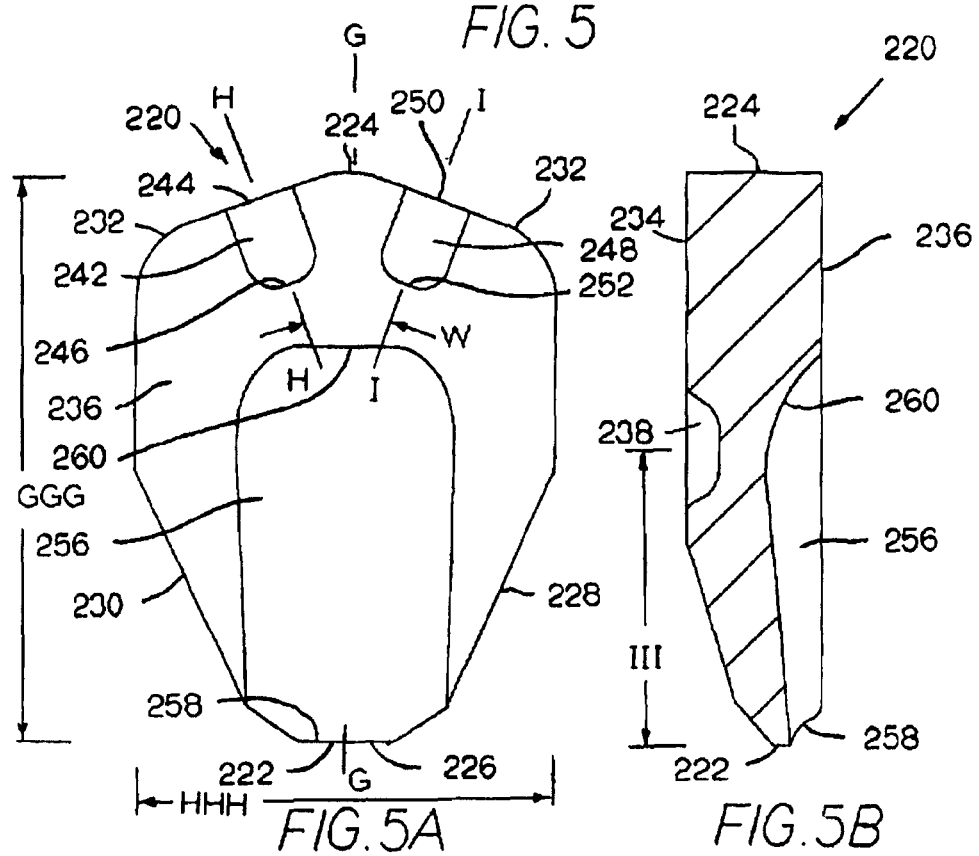
FIG. 5
FIG. 5A
FIG. 5B

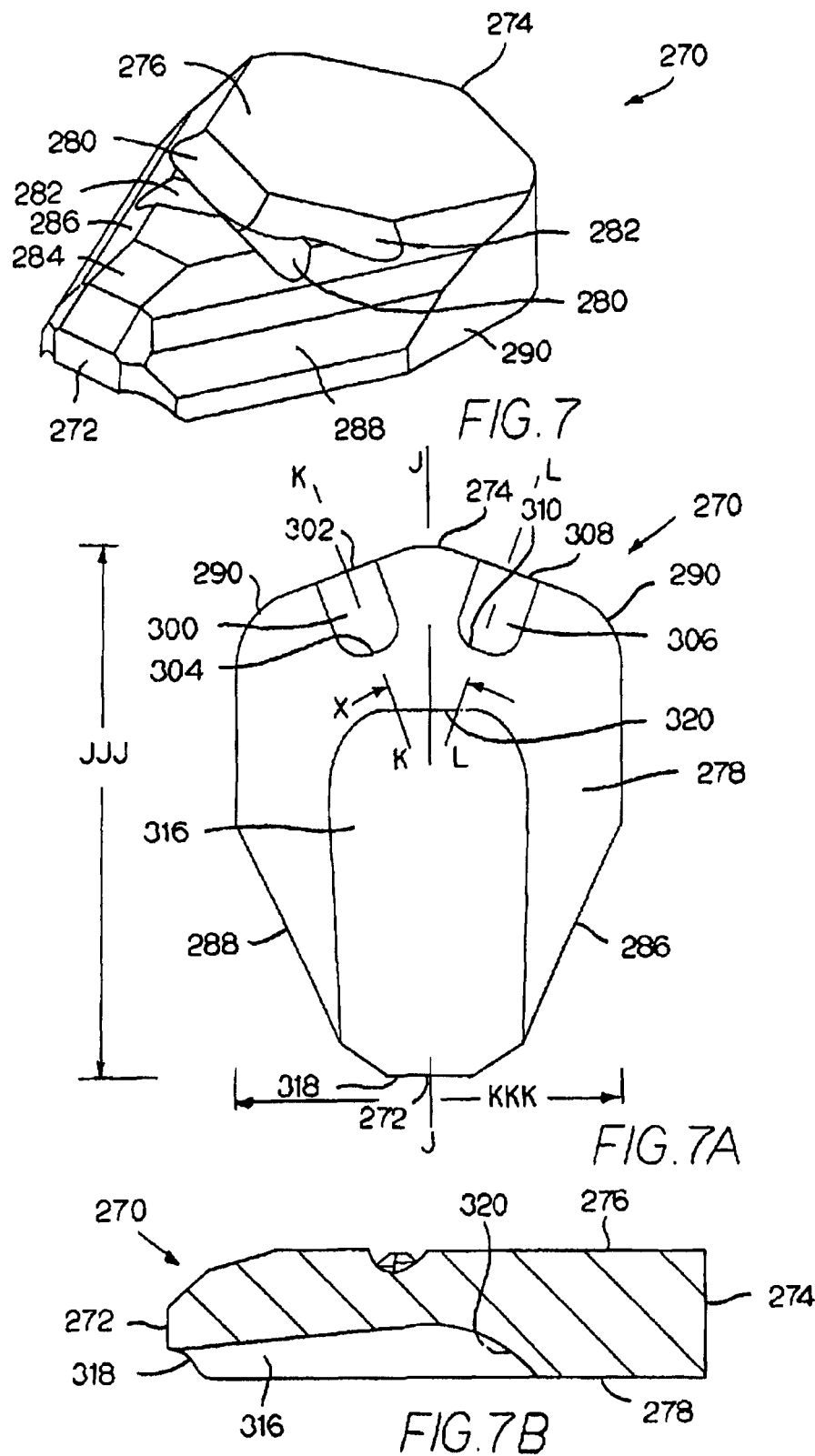

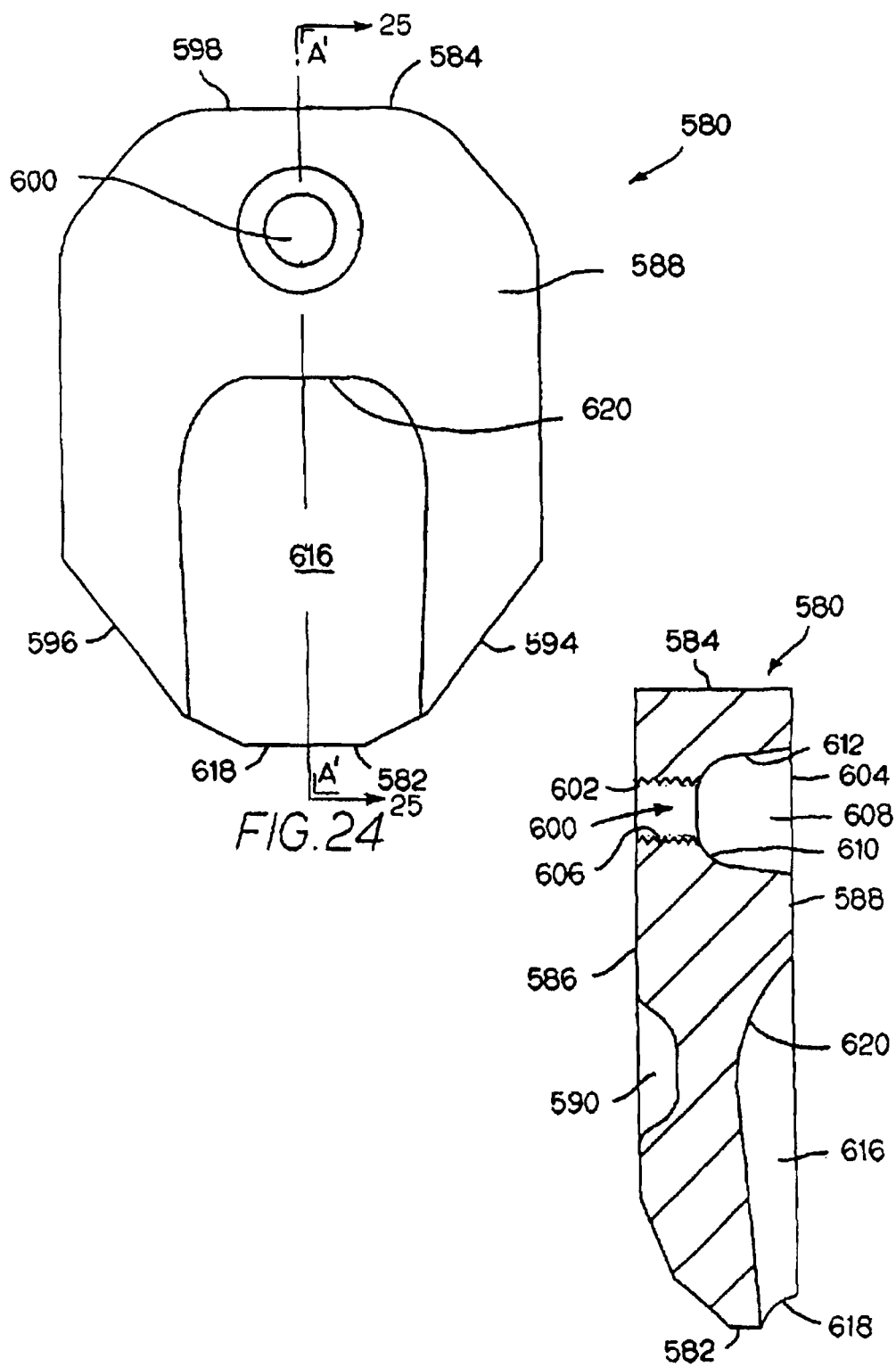

CUTTING TOOL ASSEMBLY HAVING CLAMP ASSEMBLY COMPRISING A CLAMP AND A COOLANT PLATE

CROSS-REFERENCE TO EARLIER PATENT APPLICATION

This patent application is a continuation of co-pending U.S. patent application Ser. No. 13/918,192 filed Jun. 14, 2013 by Shi Chen et al. for CUTTING TOOL ASSEMBLY HAVING CLAMP ASSEMBLY COMPRISING A CLAMP AND A COOLANT PLATE, and under the United States Patent Law including 35 USC 120 applicant hereby claims the benefit of such co-pending U.S. patent application Ser. No. 13/918,192 filed Jun. 14, 2013 by Shi Chen et al. for CUTTING TOOL ASSEMBLY HAVING CLAMP ASSEMBLY COMPRISING A CLAMP AND A COOLANT PLATE. Applicant further incorporates by reference herein the entirety of such U.S. patent application Ser. No. 13/918,192 filed Jun. 14, 2013 by Shi Chen et al. for CUTTING TOOL ASSEMBLY HAVING CLAMP ASSEMBLY COMPRISING A CLAMP AND A COOLANT PLATE.

BACKGROUND

The invention pertains to a cutting tool assembly that uses a clamp assembly to secure the cutting insert to the holder. More specifically, the invention pertains to such a cutting tool assembly, and especially the clamp assembly, wherein the clamp assembly comprises a clamp and a coolant plate that facilitates enhanced delivery of coolant adjacent the interface between the cutting insert and the workpiece (i.e., the insert-chip interface) to diminish excessive heat at the insert-chip interface in the chipforming removal of material from a workpiece.

Metal cutting tools for performing metal working operations generally comprise a cutting insert having a surface terminating at a cutting edge and a tool holder formed with a seat adapted to receive the insert. The cutting insert engages a workpiece to remove material, and in the process forms chips of the material. Excessive heat at the insert-chip interface can negatively impact upon (i.e., reduce or shorten) the useful tool life of the cutting insert.

For example, a chip generated from the workpiece can sometimes stick (e.g., through welding) to the surface of the cutting insert. The build up of chip material on the cutting insert in this fashion is an undesirable occurrence that can negatively impact upon the performance of the cutting insert, and hence, the overall material removal operation. A flow of coolant to the insert-chip interface will reduce the potential for such welding. It would therefore be desirable to reduce excessive heat at the insert-chip interface to eliminate or reduce build up of chip material.

As another example, in a chipforming material removal operation, there can occur instances in which the chips do not exit the region of the insert-chip interface when the chip sticks to the cutting insert. When a chip does not exit the region of the insert-chip interface, there is the potential that a chip can be re-cut. It is undesirable for the turning insert to re-cut a chip already removed from the workpiece. A flow of coolant to the insert-chip interface will facilitate the evacuation of chips from the insert-chip interface thereby minimizing the potential that a chip will be re-cut.

There is an appreciation that a shorter useful tool life increases operating costs and decreases overall production efficiency. Excessive heat at the insert-chip interface contribute to the welding of chip material and re-cutting of chips, both of which are detrimental to production efficiency. There are readily apparent advantages connected with decreasing the heat at the insert-chip interface wherein one way to decrease the temperature is to supply coolant to the insert-chip interface.

It is undesirable for the chip to become long. Breaking of the chip into smaller pieces is a desirable event during the material removal operation. The coolant stream can impinge the chip to thereby break the chip into the smaller pieces.

Heretofore, systems operate to lower the cutting insert temperature during cutting. For example, some systems use external nozzles to direct coolant at the cutting edge of the insert. The coolant serves not only to lower the temperature of the insert but also to remove the chip from the cutting area. The nozzles are often a distance of one to twelve inches away from the cutting edge. This is too far of a distance for effective cooling. The farther the coolant must travel, the more the coolant will mix with air and the less likely it will be to contact the tool-chip interface.

There are cutting assemblies that utilize a clamping assembly that includes a clamp and a coolant plate. For example, in U.S. Pat. No. 7,883,299 to Prichard et al. for a Metal Cutting System for Effective Coolant Delivery [K-2379USUS1] there is shown a metal cutting system that includes a shim and a cutting insert, as well as a clamp that engages a plate on top of the cutting insert. Coolant flows toward the interface between the cutting insert and the workpiece.

As another example, in United States Patent Application Publication No. US2011/0020073 A1 for Cutting Insert Assembly and Components Thereof by Chen et al. [K-3049USUS1/U.S. Ser. No. 12/874,591] there is shown a metal cutting assembly that includes a holder that receives a shim and a cutting insert. The assembly also includes a clamp and a coolant plate. Coolant flows toward the interface of the cutting insert and the workpiece.

Further, referring to [K-4080USUS1] Co-pending U.S. patent application Ser. No. 13/664,568 for Cutting Insert Assembly and Components Thereof by Henry et al., there is another cutting assembly that utilizes a clamping assembly that includes a clamp and a coolant plate, a pair of arms or prongs extended from the clamp to contact opposite side surfaces of the coolant plate and thereby secure the coolant plate in position. Such an arrangement requires that the clamp and the coolant plate be in a parallel relationship, i.e., the central longitudinal axis of the clamp and the central longitudinal axis of the coolant plate are parallel to one another. There should be an appreciation that an arrangement in which the clamp and coolant plate are parallel exhibits certain limitations in the context of trying to accommodate cutting inserts of various sizes and various holders in which the cutting insert has an orientation at different angles.

One such limitation is that different sizes of clamps and/or coolant plates are necessary to accommodate variations in the cutting inserts and the orientations of the cutting insert in the holder. This necessitates that a number of different clamps and coolant plates had to be kept in inventory to accommodate the variety of different cutting inserts. It would therefore be highly desirable to provide a clamping assembly of a clamp and coolant plate that exhibits a geometry so as to accommodate a number of different clamps and coolant plates without having to keep in inventory a variety of different cutting inserts. A reduction in the number of different clamps and/or coolant plates in inventory would result in a cost savings thereby increasing the overall efficiency of the cutting operation.

SUMMARY

The inventors have recognized the problems and/or drawbacks and/or limitations associated with earlier cutting assemblies that use coolant for delivery to the interface of the cutting insert and the workpiece. The inventors have developed an inventive cutting tool assembly, as well as components thereof, that overcome these problems and/or drawbacks and/or limitations.

In one form thereof, the invention is a clamp assembly to secure a cutting insert to a holder wherein the clamp assembly comprises a clamp that has a distal end and a clamp projection depending from the distal end of the clamp. There is a coolant plate having a top plate surface and a bottom plate surface wherein the top plate surface containing a recess wherein the recess receives the clamp projection upon assembly of the clamp and the coolant plate. The bottom plate surface contains a bowl having an open bowl end wherein in operation the bowl directs coolant through the open bowl end toward the cutting insert. There is a positioner extending between the clamp and the coolant plate so as to maintain a position of the clamp relative to the coolant plate upon the assembly of the clamp and the coolant plate.

In another form thereof, the invention is a cutting assembly for chipforming cutting of a workpiece. The cutting assembly comprises a cutting insert, and a holder having a seat wherein the seat receives the cutting insert upon assembly of the cutting insert to the holder. There is a clamp assembly to secure a cutting insert to a holder wherein the clamp assembly comprises a clamp that has a distal end and a clamp projection depending from the distal end of the clamp. There is a coolant plate having a top plate surface and a bottom plate surface wherein the top plate surface containing a recess wherein the recess receives the clamp projection upon assembly of the clamp and the coolant plate. The bottom plate surface contains a bowl having an open bowl end wherein in operation the bowl directs coolant through the open bowl end toward the cutting insert. There is a positioner extending between the clamp and the coolant plate so as to maintain a position of the clamp relative to the coolant plate upon the assembly of the clamp and the coolant plate.

In yet another form thereof, the invention is a coolant plate for use in cooperation with a clamp in a cutting assembly with a cutting insert and a clamp having a clamp projection and the clamp containing a threaded aperture wherein a threaded member extends between the threaded aperture of the clamp and the coolant plate. The coolant plate comprises a top plate surface and a bottom plate surface. The top plate surface contains a recess wherein the recess receives a clamp projection from the clamp upon assembly of the clamp and the coolant plate. The bottom plate surface contains a bowl having an open bowl end wherein in operation the bowl directs coolant through the open bowl end toward a cutting insert. The coolant plate contains a threaded aperture that receives the threaded member upon assembly of the clamp to the coolant plate so as to maintain a position of the clamp relative to the coolant plate.

In still another form thereof, the invention is a coolant plate for use in cooperation with a clamp in a cutting assembly with a cutting insert and a clamp having a clamp post and a clamp projection. The coolant plate comprises a top plate surface and a bottom plate surface. The top plate surface contains a recess wherein the recess receives a clamp projection from the clamp upon assembly of the clamp and the coolant plate. The bottom plate surface contains a bowl having an open bowl end wherein in operation the bowl directs coolant through the open bowl end toward a cutting insert. The bottom plate surface further contains a rearward notch wherein the rearward notch receives a clamp post from the clamp upon assembly of the clamp and the coolant plate.

BRIEF DESCRIPTION OF THE DRAWINGS

The following is a brief description of the drawings that form a part of this patent application:

FIG. 2A is a bottom view of the coolant plate of FIG. 2;

FIG. 2B is a cross-sectional view of the coolant plate of FIG. 2;

FIG. 5 is an isometric view from the top of a third specific embodiment of a coolant plate;

FIG. 5A is a bottom view of the coolant plate of FIG. 5;

FIG. 5B is a cross-sectional view of the coolant plate of FIG. 5;

FIG. 7 is an isometric view from the top of a fourth specific embodiment of a coolant plate useful with the specific embodiment of FIG. 6;

FIG. 7A is a bottom view of the coolant plate of FIG. 7;

FIG. 7B is a cross-sectional view of the coolant plate of FIG. 7;

FIG. 24 is a bottom view of the coolant plate of FIG. 23;

FIG. 25 is a cross-sectional view of the coolant plate of FIG. 23 taken along section line 25-25 of FIG. 24;

DETAILED DESCRIPTION

The present invention pertains to a cutting tool assembly useful for a chipforming material removal operation. In a chipforming material removal operation, the cutting insert engages a workpiece to remove material from a workpiece typically in the form of chips. A material removal operation that removes material from the workpiece in the form of chips typically is known by those skilled in the art as a chipforming material removal operation. The book *Machine Shop Practice* [Industrial Press Inc., New York , N.Y. (1981)] by Moltrecht presents at pages 199-204 a description, inter alia, of chip formation, as well as different kinds of chips (i.e., continuous chip, discontinuous chip, segmental chip). Moltrecht reads [in part] at pages 199-200, "When the cutting tool first makes contact with the metal, it compresses the metal ahead of the cutting edge. As the tool advances, the metal ahead of the cutting edge is stressed to the point where it will shear internally, causing the grains of the metal to deform and to flow plastically along a plane called the shear plane . . . When the type of metal being cut is ductile, such as steel, the chip will come off in a continuous ribbon . . . ". Moltrecht goes on to describe formation of a discontinuous chip and a segmented chip. As another example, the text found at pages 302-315 of the *ASTE Tool Engineers Handbook*, McGraw Hill Book Co., New York, N.Y. (1949) provides a lengthy description of chip formation in the metal cutting process. At page 303, the ASTE Handbook makes the clear connection between chip formation and machining operations such as turning, milling and drilling. The following patent documents discuss the formation of chips in a material removal operation: U.S. Pat. No. 5,709,907 to Battaglia et al. (assigned to Kennametal Inc.), U.S. Pat. No. 5,722,803 to Battaglia et al. (assigned to Kennametal Inc.), and U.S. Pat. No. 6,161,990 to Oles et al. (assigned to Kennametal Inc.).

Figure 1:
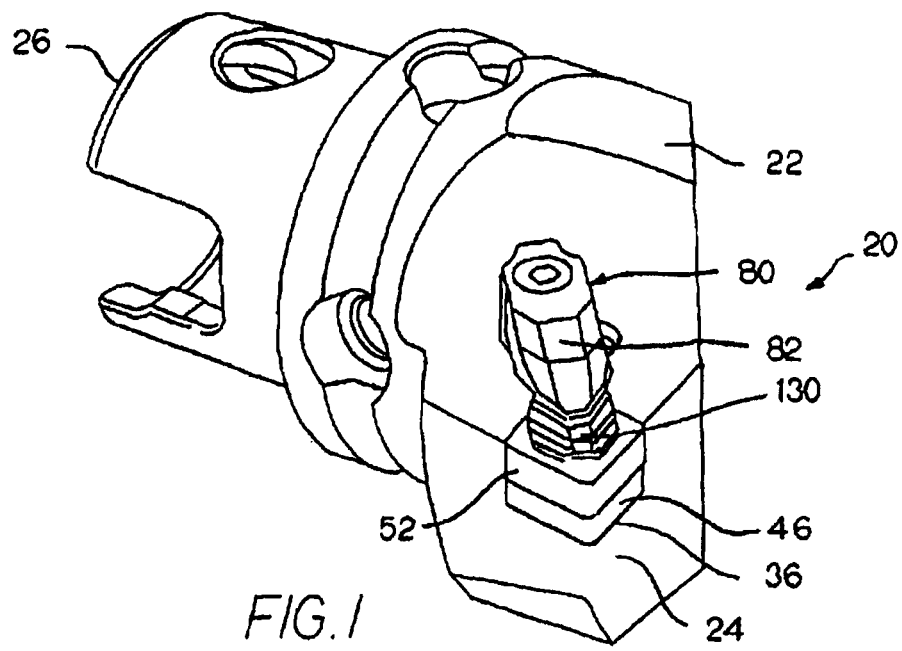
FIG. 1 is an isometric view of one specific embodiment of a cutting tool assembly.
Figure 3:
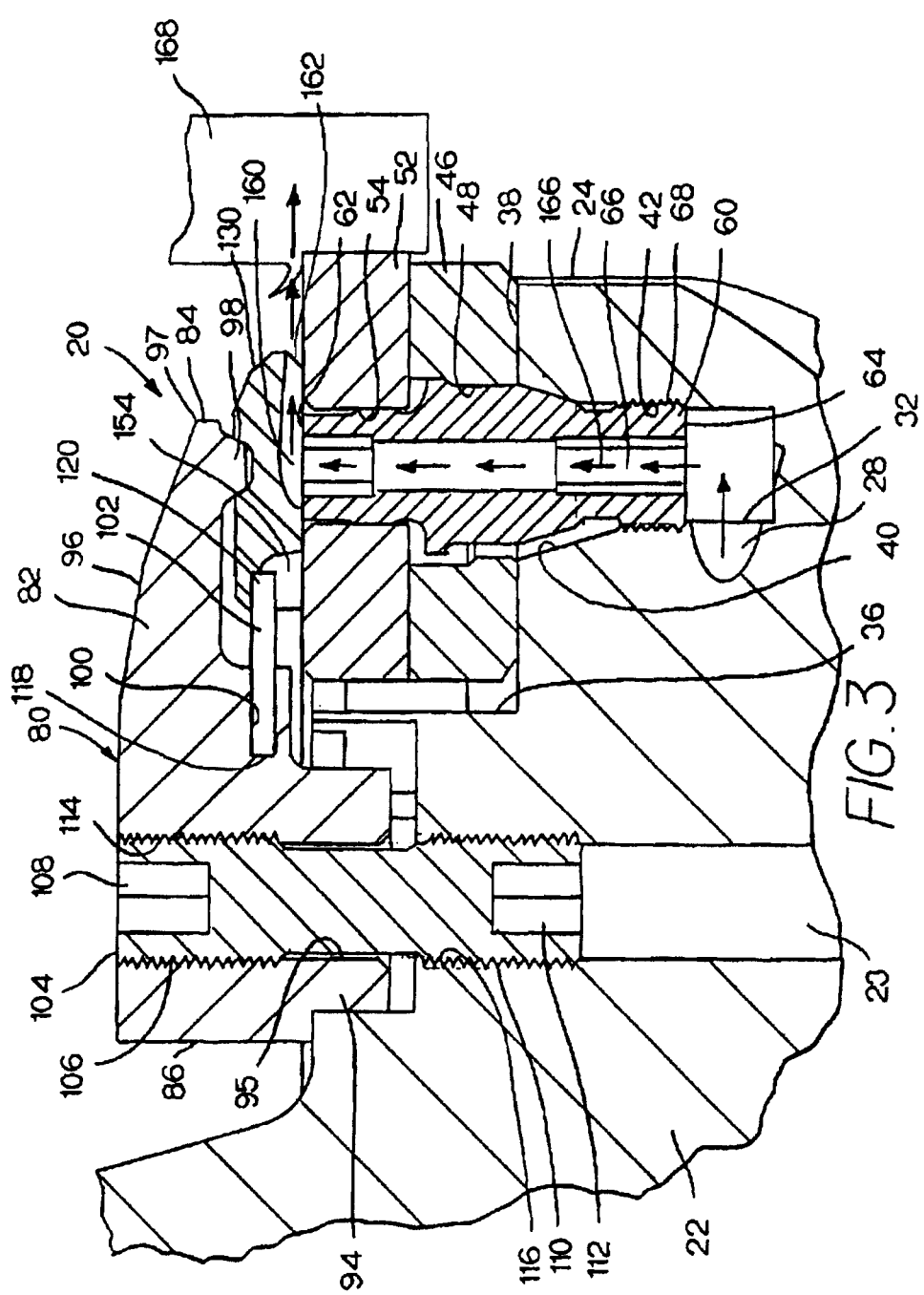
FIG. 3 is a cross-sectional schematic view of the specific embodiment of FIG. 1 showing the relationship between the components of the cutting tool assembly and the flow of coolant.

Referring to the drawings, FIG. 1 and FIG. 3 show a first specific embodiment of a cutting tool assembly generally designated as 20. Cutting tool assembly 20 comprises a holder 22 that has a clamp bore 23. Holder 22 further has a forward end 24 and a rearward end 26. Holder 22 contains a coolant passage 28 that has an entrance (not illustrated) and an exit 32. Holder 22 further has a seat 36 which exhibits a seating surface 38. Holder 22 contains a seat bore 40 with a threaded portion 42.

Cutting tool assembly 20 further includes a shim 46 that contains a central aperture 48 and a cutting insert 52 that contains a central aperture 54. Cutting tool assembly 20 also includes a locking pin 60 that has an upper end 62 and a lower end 64 and a central longitudinal bore 66 wherein the bore 66 has a threaded section 68.

Figure 10:
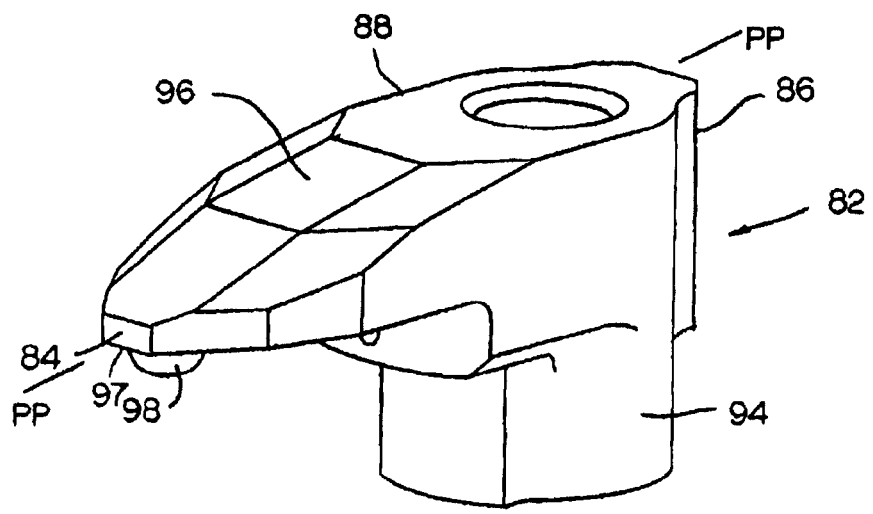
FIG. 10 is an isometric view of a first specific embodiment of a clamp member for use with the specific embodiment of FIG. 1.
Figure 11:
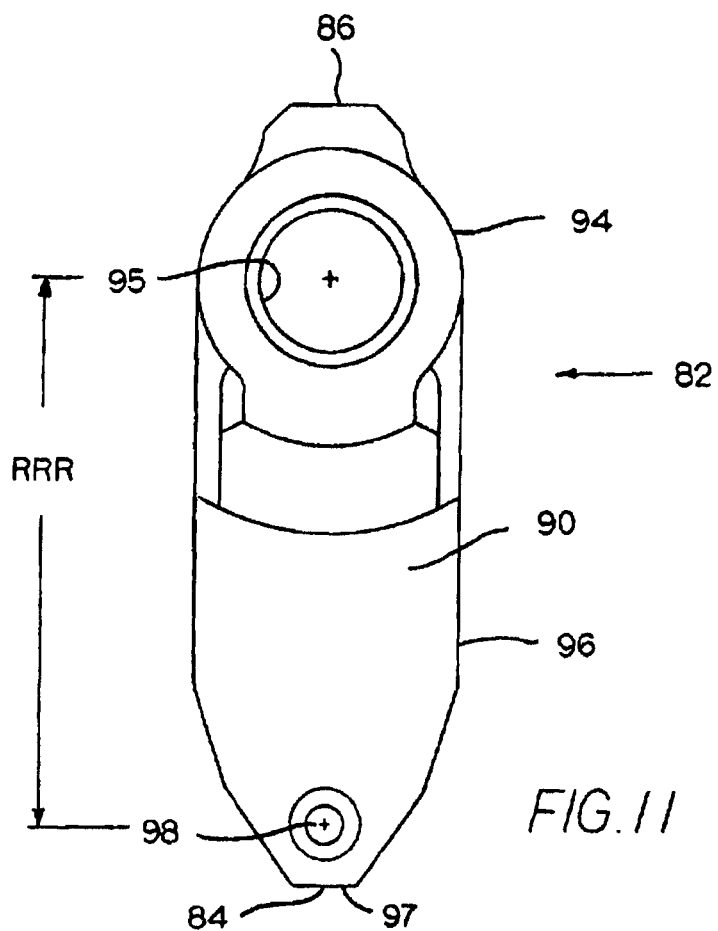
FIG. 11 is a bottom view of the clamp member of FIG. 10.
Figure 12:
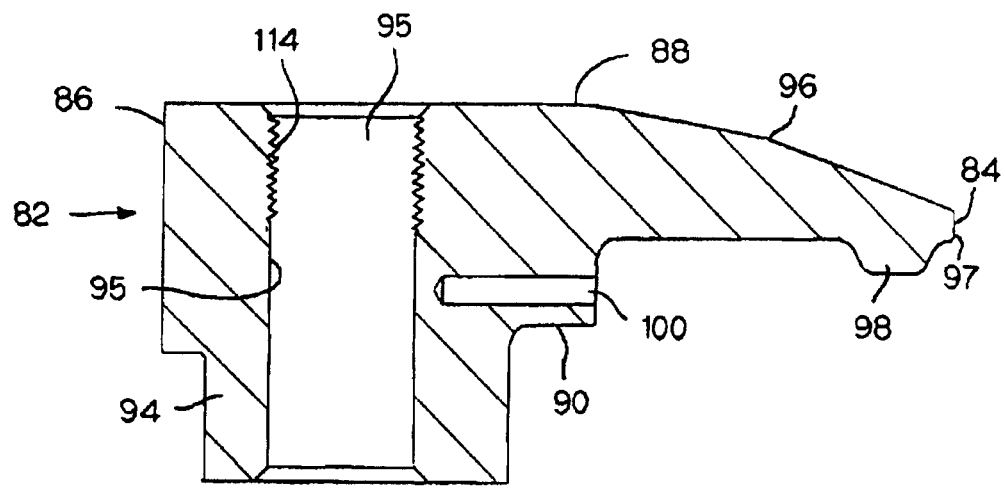
FIG. 12 is a cross-sectional view of the clamp member of FIG. 10.

Still referring to FIGS. 1 and 3, as well as FIGS. 10-12, cutting tool assembly 20 further includes a first specific embodiment of a clamp assembly 80. Clamp assembly 80 includes a clamp member 82 which has a forward end 84, a rearward end 86, a top surface 88 and a bottom surface 90. Clamp member 82 has a clamp base portion 94, which contains a cylindrical bore 95. Clamp member 82 has a clamp arm 96, which has a distal end 97. There is a clamp projection 98 in the form of a boss depending from the adjacent distal end 97 of the clamp arm 96. The distance from the center of the cylindrical bore 95 to the center of the clamp projection 98 is distance RRR.

The clamp member 82 further contains a post bore 100 that receives a clamp post 102 (see FIG. 3). The clamp post 102 has a proximate end 118 and a distal end 120 that projects out from the post bore 100. As will be described hereinafter, the portion of the clamp post 102 adjacent the distal end 120 is received within a rearward notch (described hereinafter) in the coolant plate to help secure and align the coolant plate relative to the clamp 82.

The clamp assembly 80 further includes a threaded member 104 that has an upper threaded portion 106 with a socket 108 and a lower threaded section 110 with a socket 112. Cylindrical bore 95 has a threaded section 114. Clamp bore 23 has a threaded section 116. The upper threaded section 106 of the threaded member 104 threadedly engages the threaded upper section 114 of the bore 95. The lower threaded section 110 of the threaded member 104 threadedly engages the threaded section 116 of the bore 23. The threaded member 104 securely fastens the clamp 82 to the holder 22, and as will be described hereinafter, the clamp 82 tightly presses down on the coolant plate, which in turn, presses down on the cutting insert 52 and the shim 46.

Figure 2:
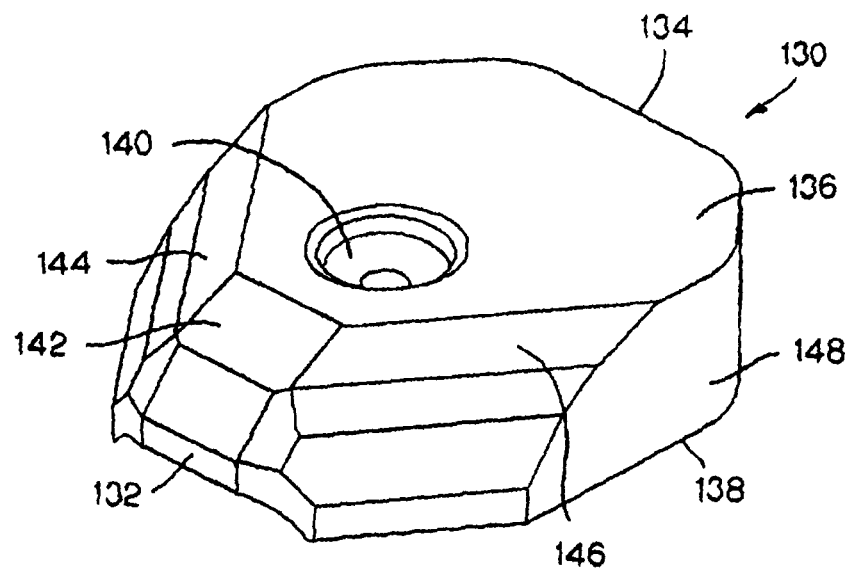
FIG. 2 is an isometric view from the top of a first specific embodiment of a coolant plate wherein the coolant plate is useful with the specific embodiment of FIG. 1.

Referring to FIGS. 2, 2A and 2 B, there is shown a first specific embodiment of a coolant plate generally designated as 130. Coolant plate 130 has a forward end 132, a rearward end 134, a top plate surface 136 and a bottom plate surface 138. The top plate surface 136 contains a recess 140, which is in the form of a circular depression. Coolant plate 130 has a sloped forward surface region 142, swept-back opposite side surface regions 144, 146 and a generally U-shaped rear surface region 148 that extends between the opposite side surface regions 144, 146. There is a rearward post notch 154 at the juncture of the bottom plate surface 138 and the rear surface 148. The rearward post notch 154 has an open end 156 and a closed end 158. The bottom plate surface 138 of the coolant plate 130 contains a bowl 160 that has an open end 162 and a closed end 164. The coolant plate 130 has a central longitudinal axis A-A. The rearward post notch 154 has a central longitudinal axis B-B. Central longitudinal axis A-A is generally coaxial with the central longitudinal axis B-B. The axial length of coolant plate 130 is AAA and the maximum transverse dimension (or width) is BBB. The distance from the center of the recess 140 to the forward end 132 of the coolant plate 130 is CCC.

Referring back to FIG. 3, in operation, coolant, which is typically under pressure, passes through the coolant passage 28 so as to exit the coolant passage 28 at the exit 32 thereof. As shown by the arrows 166, coolant flows through the central longitudinal bore 66 of the locking pin 60. Coolant enters into the volume defined by the bowl 160 in the coolant plate 130 and impinges the surfaces that define the bowl 160 so that coolant is directed so as to exit out of the open end 162 of the bowl 160. The coolant travels toward the interface between the cutting insert 52 and the workpiece 168. The coolant enters and exits the bowl in a like fashion for each one of the specific embodiments of the coolant plates that are described hereinafter. The capability to provide adequate coolant flow to the interface between the cutting insert and the workpiece has advantages. For example, a chip generated from the workpiece can sometimes stick (e.g., through welding) to the surface of the cutting insert. The build up of chip material on the cutting insert in this fashion is an undesirable occurrence that can negatively impact upon the performance of the cutting insert, and hence, the overall material removal operation. A flow of coolant to the insert-chip interface will reduce the potential for such welding. It would therefore be desirable to reduce excessive heat at the insert-chip interface to eliminate or reduce build up of chip material. Further, in a chipforming material removal operation, there can occur instances in which the chips do not exit the region of the insert-chip interface when the chip sticks to the cutting insert. When a chip does not exit the region of the insert-chip interface, there is the potential that a chip can be re-cut. It is undesirable for the turning insert to re-cut a chip already removed from the workpiece. A flow of coolant to the insert-chip interface will facilitate the evacuation of chips from the insert-chip interface thereby minimizing the potential that a chip will be re-cut. In addition, it is undesirable for the chip to become long. Breaking of the chip into smaller pieces is a desirable event during the material removal operation. The coolant stream can impinge the chip to thereby break the chip into the smaller pieces.

Figure 4:
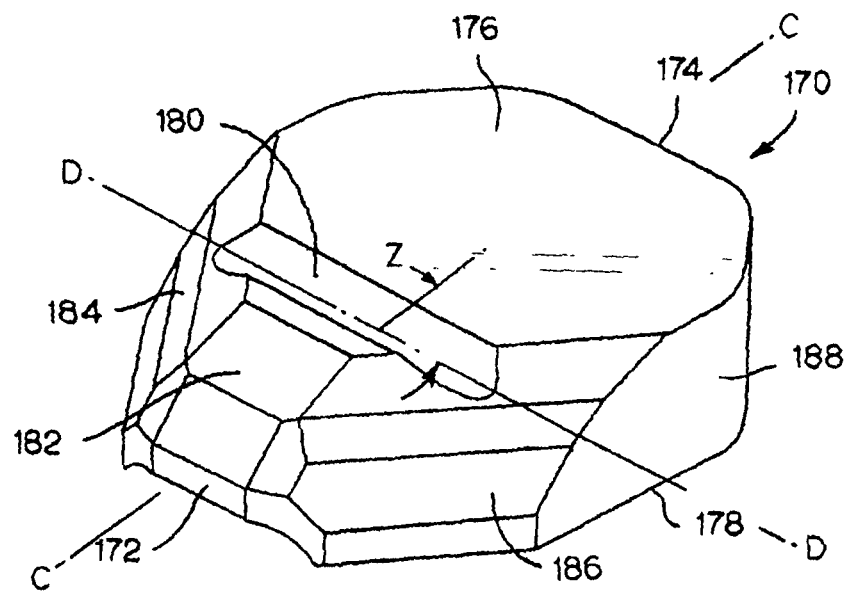
FIG. 4 is an isometric view from the top of a second specific embodiment of a coolant plate.
Figure 4A:
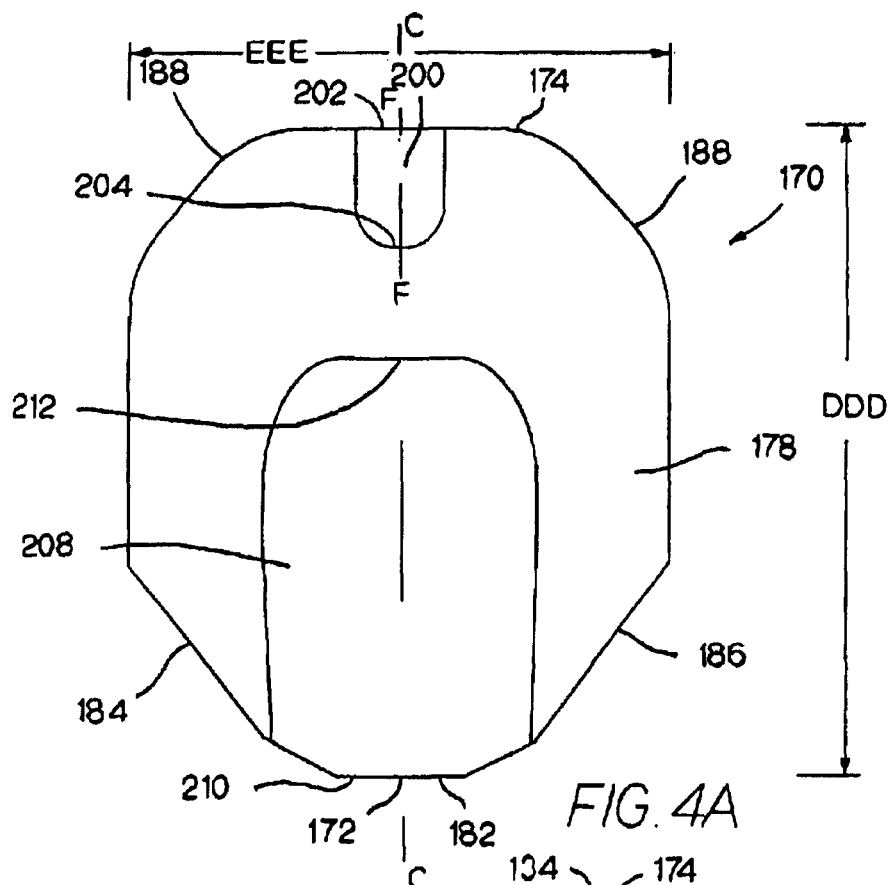
FIG. 4A is a bottom view of the coolant plate of FIG. 4.
Figure 4B:
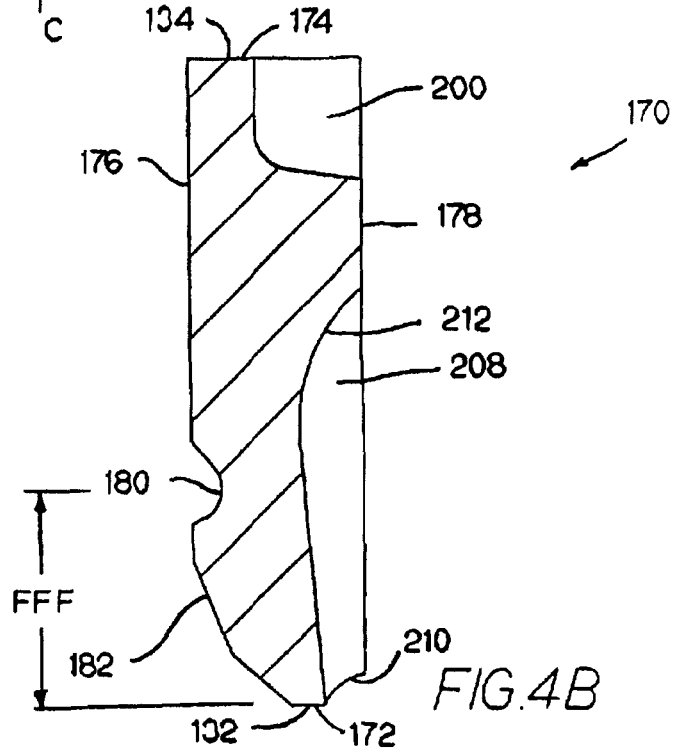
FIG. 4B is a cross-sectional view of the coolant plate of FIG. 4.

Referring to FIGS. 4, 4A and 4B, there is shown a second specific embodiment of a coolant plate generally designated as 170. Coolant plate 170 has a central longitudinal axis C-C. Coolant plate 170 has a forward end 172, a rearward end 174, a top plate surface 176 and a bottom plate surface 178. The top plate surface 176 contains a recess 180, which is in the form of an elongate trough. Recess 180 has a central longitudinal axis D-D. Recess 180 is disposed at angle Z relative to the central longitudinal axis C-C of coolant plate 170. Angle Z I equal to about 90 degrees. Coolant plate 170 has a sloped forward surface region 182, swept-back opposite side surface regions 184, 186 and a U-shaped rear surface region 188 that extends between the opposite side surface regions 184, 186. There is a rearward post notch 200 at the juncture of the bottom plate surface 178 and the rear surface 188. The rearward post notch 200 has an open end 202 and a closed end 204. The rearward post notch 200 has a central longitudinal axis F-F. The bottom plate surface 178 of the coolant plate 170 contains a bowl 208 that has an open end 210 and a closed end 212. As described above, coolant travels into the bowl 208 and impinges the surfaces defining the bowl 208 whereby coolant exits the bowl 208 via the open end 210 thereof. The axial length of coolant plate 170 is DDD and the maximum transverse dimension (or width) is EEE. The distance from the center of the recess 180 to the forward end 172 of the coolant plate 170 is FFF.

Referring to FIGS. 5, 5A and 5B, there is shown a third specific embodiment of a coolant plate generally designated as 220. Coolant plate 220 has a central longitudinal axis G-G. Coolant plate 220 has a forward end 222, a rearward end 224, a top plate surface 234 and a bottom plate surface 236. The top plate surface 234 contains a recess 238, which is in the form of a circular depression. Coolant plate 220 has a sloped forward surface 226, swept-back opposite side surfaces 228, 230, and a semi-circular rear surface 232 that extends between the swept-back opposite side surface regions 228, 230. There is a first rearward post notch 242 at the juncture of the bottom plate surface 236 and the rear surface 232. The first rearward post notch 242, which has a central longitudinal axis H-H, has an open end 244 and a closed end 246. There is a second rearward post notch 248 at the juncture of the bottom plate surface 236 and the rear surface 232. The second rearward post notch 248, which has a central longitudinal axis I-I, has an open end 250 and a closed end 252. The first rearward post notch 242 is disposed at angle W relative to the second rearward post notch 248. Angle W is the angle between a central longitudinal axis H-H and a central longitudinal axis I-I. In the specific embodiment, angle W is equal to about 40 degrees. The bottom plate surface 236 of the coolant plate 220 contains a bowl 256 that has an open end 258 and a closed end 260. As described above, coolant travels into the bowl 256 and impinges the surfaces defining the bowl 256 whereby coolant exits the bowl 256 via the open end 258 thereof. The axial length of coolant plate 220 is GGG and the maximum transverse dimension (or width) is HHH. The distance from the center of the recess 238 to the forward end 222 of the coolant plate 220 is III.

Figure 6:
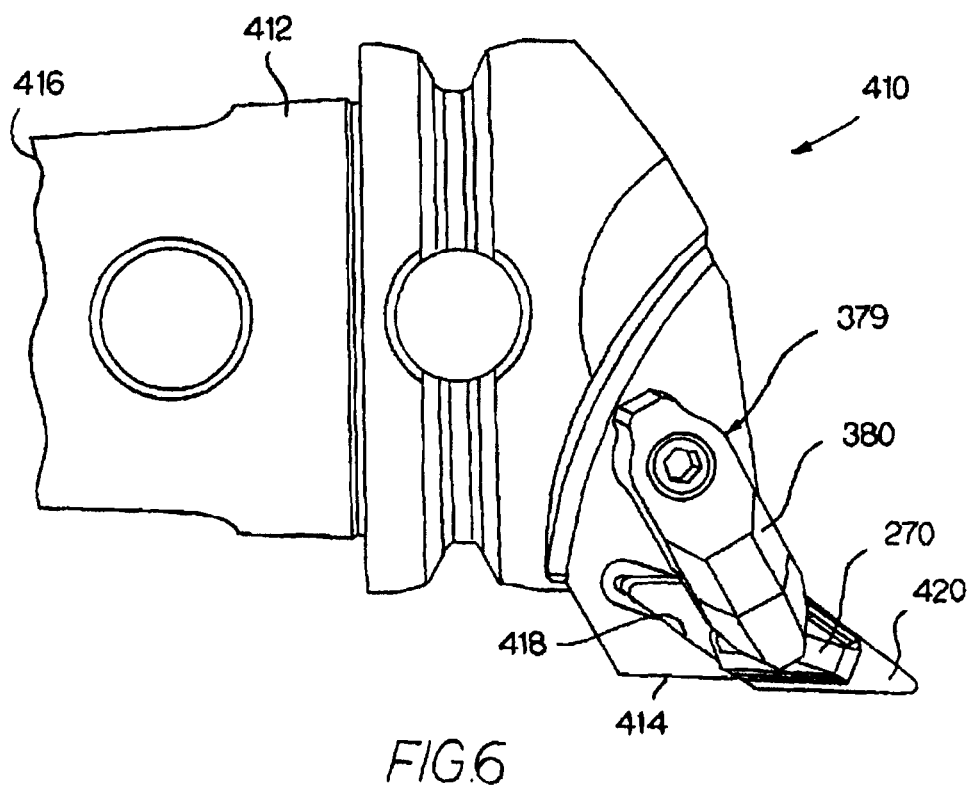
FIG. 6 is an isometric view of another specific embodiment of a cutting tool assembly.

Referring to FIG. 6, there is shown a second specific embodiment of a cutting assembly generally designated as 410. Cutting assembly 410 includes a holder 412 that has a forward end 414 and a rearward end 416. The holder 412 contains a seat 418 adjacent to the forward end 414. The seat 418 receives a cutting insert 420 and shim (not illustrated).

Figure 7C:
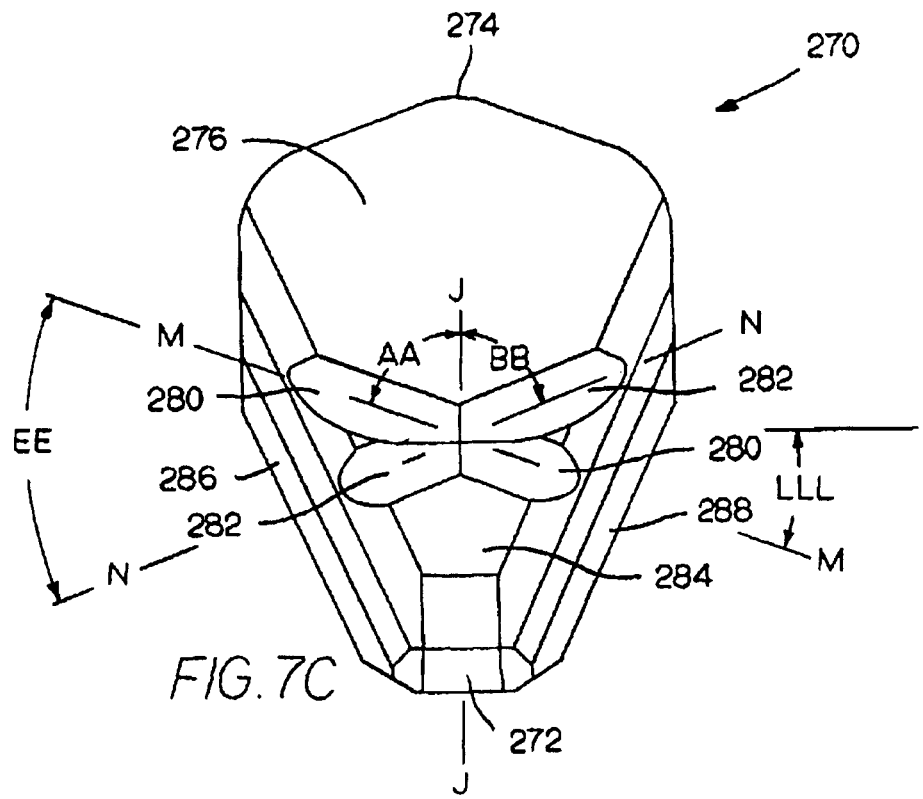
FIG. 7C is an isometric view of the top surface of the coolant plate of FIG. 7.

Referring to FIGS. 7, 7A, 7B, and 7C, there is shown a fourth specific embodiment of a coolant plate generally designated as 270. Coolant plate 270 has a central longitudinal axis J-J. Coolant plate 270 has a forward end 272, a rearward end 274, a top plate surface 276, and a bottom plate surface 278. The top plate surface 276 contains a pair of intersecting recesses 280, 282. Referring to FIG. 7C, one recess 280, which is in the form of an elongate trough, has a central longitudinal axis M-M, and the other recess 282, which is in the form of an elongate trough, has a central longitudinal axis N-N. Central longitudinal axis M-M is disposed at angle LLL relative to the transverse axis of coolant plate 270. Angle LLL is equal to about 20 degrees. Recess 280 is disposed at angle EE relative to recess 282. Angle EE is the angle between central longitudinal axes M-M and N-N. Angle EE is equal to about 40 degrees. Further, each recess 280, 282 (or notch) has a notch disposition angle AA, BB, respectively. The notch disposition angle (AA, BB) is the angle at which the central longitudinal axis (M-M, N-N) is disposed relative to the coolant plate central longitudinal axis J-J. In this specific embodiment, angle AA and angle BB each equals 70 degrees. Coolant plate 270 has a sloped forward surface region 284, swept-back opposite side surface regions 286, 288, and a U-shaped rear surface region 290 extending between the opposite side surface regions 286, 288. The axial length of coolant plate 270 is JJJ and the maximum transverse dimension (or width) is KKK.

There is a first rearward post notch 300 at the juncture of the bottom plate surface 278 and the rear surface 290. The first rearward post notch 300, which has a central longitudinal axis K-K, has an open end 302 and a closed end 304. There is a second rearward post notch 306 at the juncture of the bottom plate surface 278 and the rear surface 290. The second rearward post notch 306, which has a central longitudinal axis L-L, has an open end 308 and a closed end 310. The first rearward post notch 300 is disposed at angle X relative to the second rearward post notch 306. Angle X is the angle between central longitudinal axes K-K and L-L. Angle X is equal to about 40 degrees. The relationships between angles AA, BB and X are: X/2+AA=90 degrees and AA=BB. Further, the relationship between the rearward post notches (i.e., first rearward post notch 300 and second rearward post notch 306) and the recesses 280, 282 are: (1) the central longitudinal axis K-K of the first rearward post notch 300 is perpendicular to the central longitudinal axis M-M of recess 280, and (2) the central longitudinal axis L-L of the second rearward post notch 306 is perpendicular to the central longitudinal axis N-N of recess 282.

The bottom plate surface 278 of the coolant plate 270 contains a bowl 316 that has an open end 318 and a closed end 320. As described above, coolant travels into the bowl 316 and impinges the surfaces defining the bowl 316 whereby coolant exits the bowl 316 via the open end 318 thereof.

Figure 8:
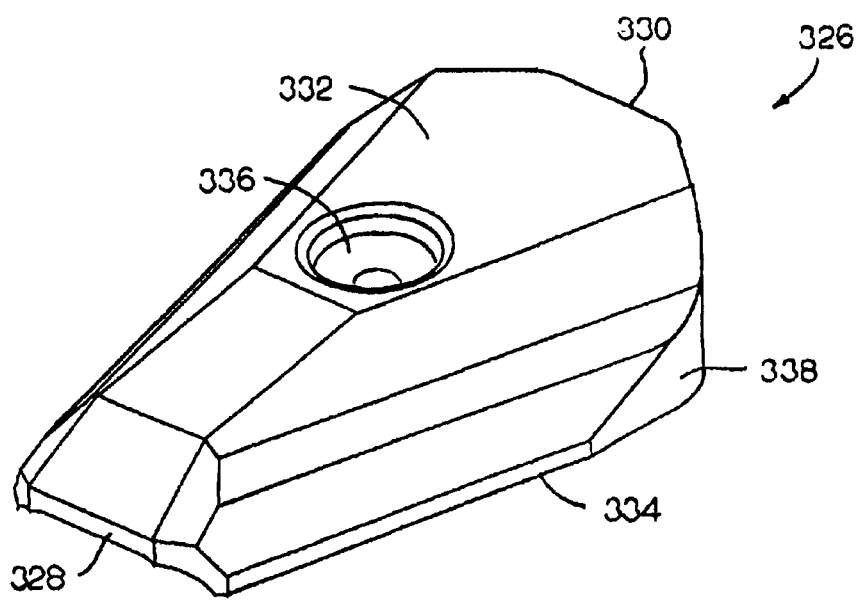
FIG. 8 is an isometric view from the top of a fifth specific embodiment of a coolant plate.
Figure 8A:
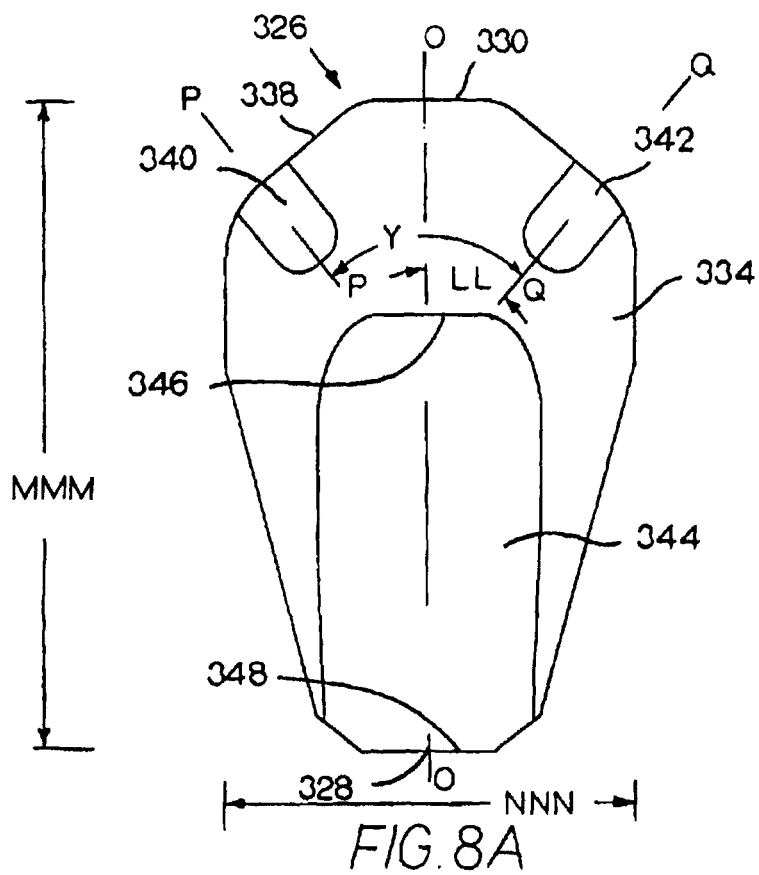
FIG. 8A is a bottom view of the coolant plate of FIG. 8.
Figure 8B:
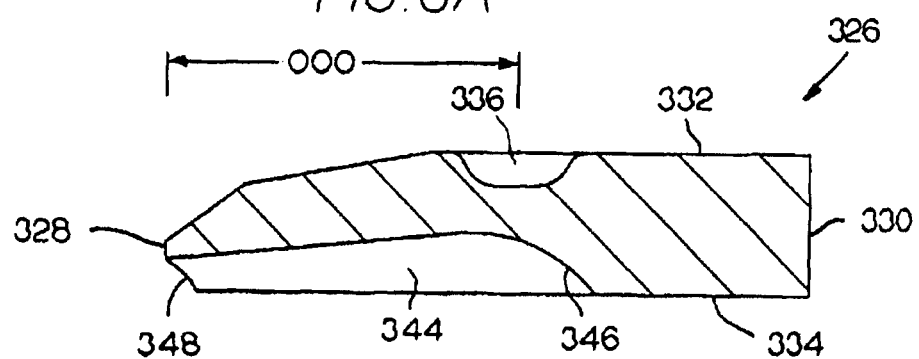
FIG. 8B is a cross-sectional view of the coolant plate of FIG. 8.

Referring to FIGS. 8, 8A and 8 B, there is shown a fifth specific embodiment of a coolant plate generally designated as 326. Coolant plate 326 has a central longitudinal axis O-O. Coolant plate 326 has a forward end 328, a rearward end 330, a top plate surface 332, and a bottom plate surface 334. The top plate surface 332 contains a recess 336, which is in the form of a circular depression. Coolant plate 326 has a sloped forward surface region, swept-back opposite side surface regions, and a U-shaped rear surface region 338 extending between the opposite side surface regions.

There is a first rearward post notch 340 at the juncture of the bottom plate surface 334 and the rear surface 338. The first rearward post notch 340, which has a central longitudinal axis P-P, has an open end and a closed end. There is a second rearward post notch 342 at the juncture of the bottom plate surface 334 and the rear surface 338. The second rearward post notch 342, which has a central longitudinal axis Q-Q, has an open end and a closed end. The first rearward post notch 340 is disposed at angle Y relative to the second rearward post notch 342. Angle Y is the angle between central longitudinal axes P-P and Q-Q. Angle Y is equal to about 80 degrees. The axial length of coolant plate 326 is MMM and the maximum transverse dimension (or width) is NNN. The distance from the center of the recess 336 to the forward end 328 of the coolant plate 326 is OOO.

The bottom plate surface 334 of the coolant plate 326 contains a bowl 344 that has an open end 348 and a closed end 346. As described above, coolant travels into the bowl 344 and impinges the surfaces defining the bowl 344 whereby coolant exits the bowl 344 via the open end 348 thereof.

Figure 9:
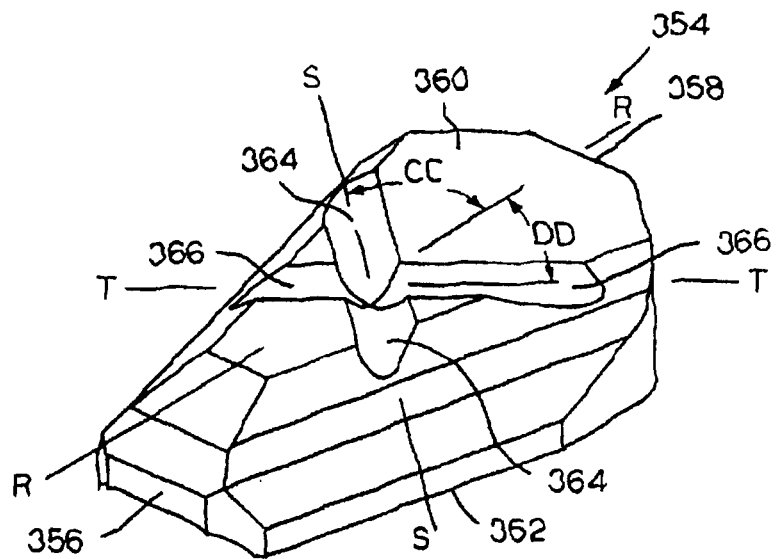
FIG. 9 is an isometric view from the top of a sixth specific embodiment of a coolant plate.
Figure 9A:
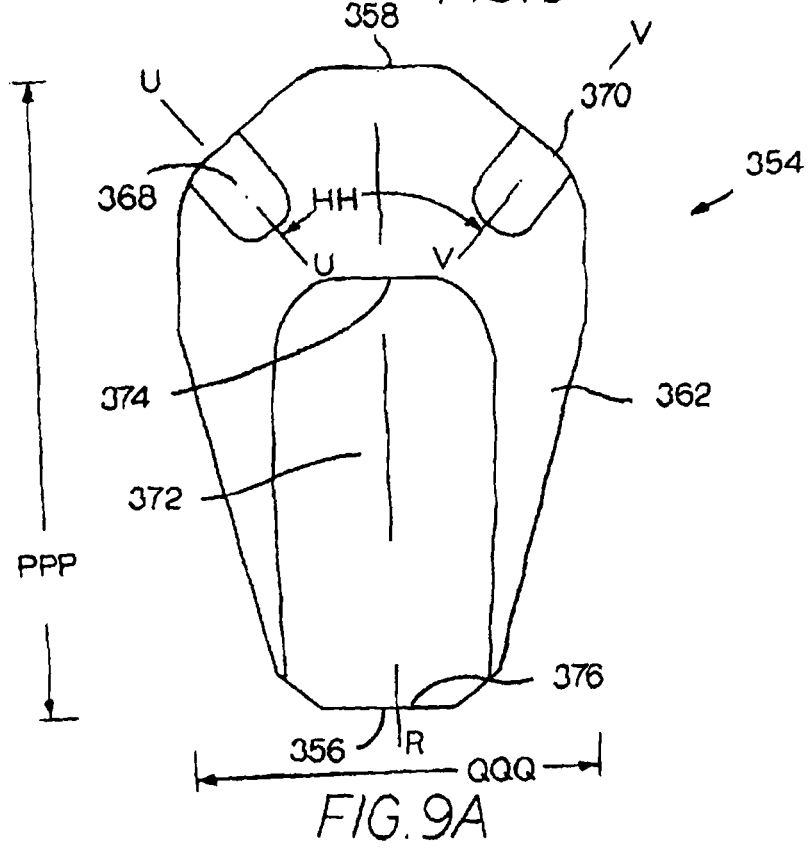
FIG. 9A is a bottom view of the coolant plate of FIG. 9.

Referring to FIGS. 9 and 9A, there is shown a sixth specific embodiment of a coolant plate generally designated as 354. Coolant plate 354 has a central longitudinal axis R-R. Coolant plate 354 has a forward end 356, a rearward end 358, a top plate surface 360, and a bottom plate surface 362. The top plate surface 360 contains one recess 364, which is in the form of an elongate trough and has a central longitudinal axis S-S. The top plate surface 360 further contains another recess 366, which is in the form of an elongate trough and has a central longitudinal axis T-T. One recess 364 intersects with the other recess 366. One recess 364 is disposed relative to the central longitudinal axis R-R of the coolant plate 354 at angle CC. Other recess 366 is disposed relative to the central longitudinal axis R-R of the coolant plate 354 at angle DD. One recess 364 is disposed relative to the other recess 366 at angle equal to the sum of angles CC and DD. Coolant plate 354 has a sloped forward surface region, swept-back opposite side surface regions, and a U-shaped rear surface region 367 extending between the opposite side surface regions. The axial length of coolant plate 354 is PPP and the maximum transverse dimension (or width) is QQQ.

There is a first rearward post notch 368 at the juncture of the bottom plate surface 362 and the rear surface 367. The first rearward post notch 368, which has a central longitudinal axis U-U, has an open end and a closed end. There is a second rearward post notch 370 at the juncture of the bottom plate surface 362 and the rear surface 367. The second rearward post notch 370, which has a central longitudinal axis V-V, has an open end and a closed end. The first rearward post notch 368 is disposed at angle HH relative to the second rearward post notch 370. Angle HH is the angle between central longitudinal axes U-U and V-V. Angle HH is equal to about 80 degrees.

The bottom plate surface 362 of the coolant plate 354 contains a bowl 372 that has an open end 376 and a closed end 374. As described above, coolant travels into the bowl 372 and impinges the surfaces defining the bowl 372 whereby coolant exits the bowl 372 via the open end 376 thereof.

Figure 13:
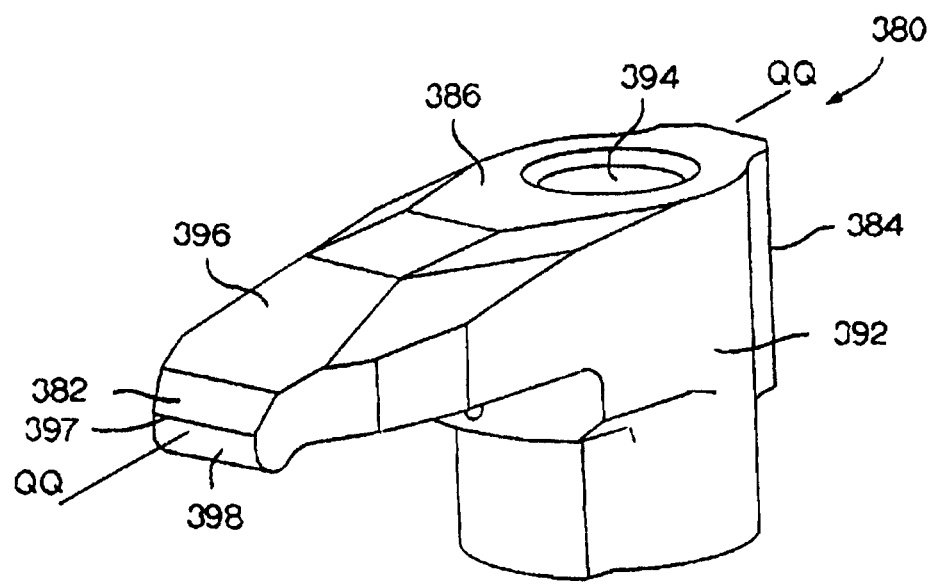
FIG. 13 is an isometric view of a second specific embodiment of a clamp member for use with the specific embodiment of FIG. 6.
Figure 14:
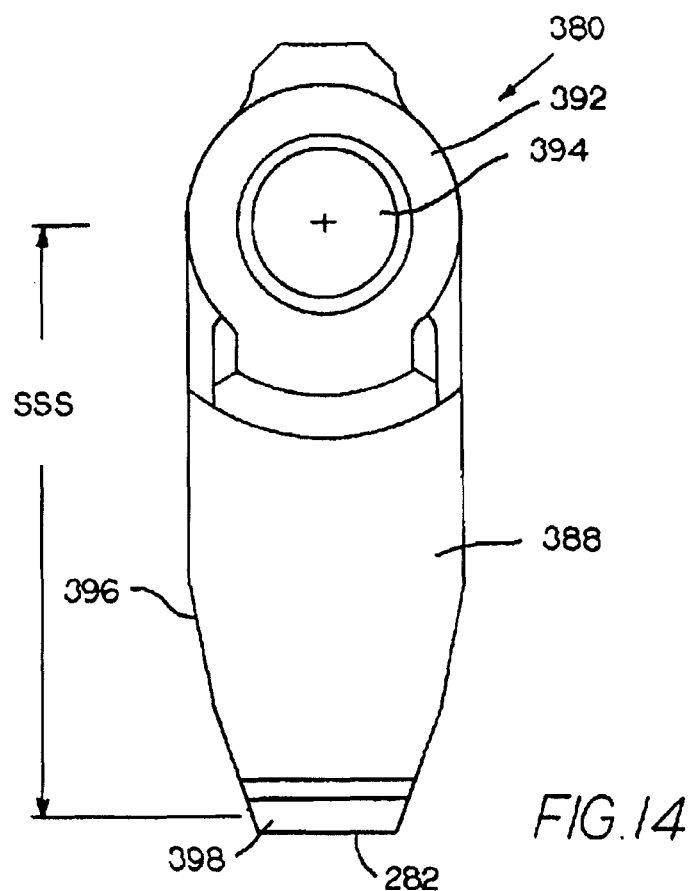
FIG. 14 is a bottom view of the clamp member of FIG. 13.
Figure 15:
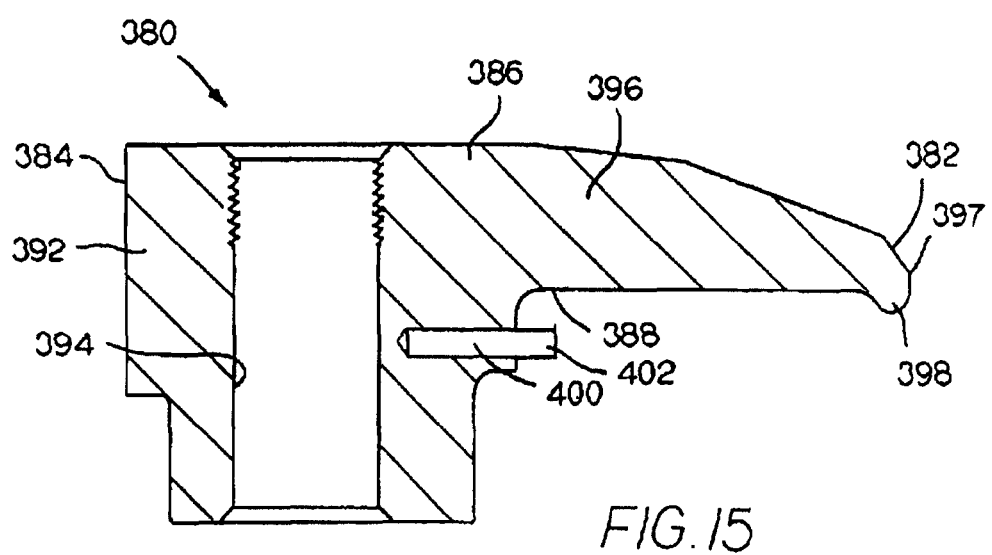
FIG. 15 is a cross-sectional view of the clamp member of FIG. 13.

Referring to FIGS. 13 through 15, there is shown a second specific embodiment of a clamp generally designated as 379 that includes a clamp 380. Clamp 380 has a forward end 382, a rearward end 384, a top clamp surface 386 and a bottom clamp surface 388. Clamp 380 has a clamp base 392 that contains a cylindrical bore 394. Clamp 380 further has an arm 396 with a distal end 397 wherein a clamp projection in the form of a rib 398 projects there from. The clamp 380 contains a post bore 400, which receives a clamp post 402. The distance from the center of the cylindrical bore 394 to the center of the clamp projection 398 is SSS.

Set forth below is Table I that sets forth the dimensions of specific embodiments of the various coolant plates and clamps described above.

TABLE I

Dimensions of Coolant Plates and Clamps

| Dimension | Description | Magnitude [millimeters (mm)] |
|---|---|---|
| AAA | axial length of coolant plate 130 | 11.30 mm |
| BBB | maximum transverse dimension of coolant plate 130 | 9.46 mm |
| CCC | distance from the center of recess 140 to forward end 132 of coolant plate 130 | 4.99 mm |
| DDD | axial length of coolant plate 170 | 11.30 mm |
| EEE | maximum transverse dimension of coolant plate 170 | 9.46 mm |
| FFF | distance from the center of recess 1180 to forward end 172 of coolant plate 170 | 3.78 mm |

TABLE I-continued

Dimensions of Coolant Plates and Clamps

| Dimension | Description | Magnitude [millimeters (mm)] |
|---|---|---|
| GGG | axial length of coolant plate 220 | 12.87 mm |
| HHH | maximum transverse dimension of coolant plate 220 | 9.46 mm |
| III | distance from the center of recess 228 to forward end 222 of coolant plate 220 | 6.69 mm |
| JJJ | axial length of coolant plate 270 | 12.87 mm |
| KKK | maximum transverse dimension of coolant plate 270 | 9.46 mm |
| MMM | axial length of coolant plate 326 | 14.00 mm |
| NNN | maximum transverse dimension of coolant plate 326 | 9.00 mm |
| OOO | distance from the center of recess 336 to forward end 328 of coolant plate 326 | 7.69 mm |
| PPP | axial length of coolant plate 354 | 14.00 mm |
| QQQ | maximum transverse dimension of coolant plate 354 | 9.00 mm |
| RRR | distance from center of cylindrical bore 95 to center of clamp projection 98 | 19.21 mm |
| SSS | distance from center of cylindrical bore 394 to center of clamp projection 398 | 20.40 mm |

As described hereinabove, there are two basic clamp designs; namely, the first specific embodiment of the clamp 82 which has a clamp projection 98 in the form of a boss. This specific clamp 82 is designed to cooperate with the recess in the form of a circular depression which is found in the top plate surface of selected coolant plates. In this regard, the coolant plates that are suitable to cooperate with clamp 82 are the first specific embodiment coolant plate 130, the third specific embodiment coolant plate 220, and the fifth specific embodiment coolant plate 326. For each of the above coolant plates, i.e., coolant plate 130, coolant plate 220, and coolant plate 326, the clamp projection 98 in the form of a boss is received by the respective recess 140, 238, 336, respectively, which is in the form of a circular depression. The clamp facilitates the secure assembly of the coolant plate to the cutting assembly.

Figure 16:
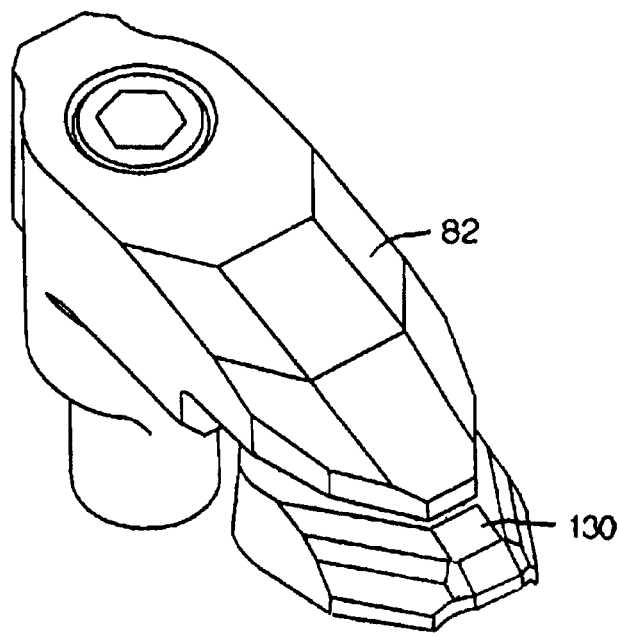
FIG. 16 is an isometric view from top of the clamp and diverter plate of the specific embodiment of FIG. 2.
Figure 17:
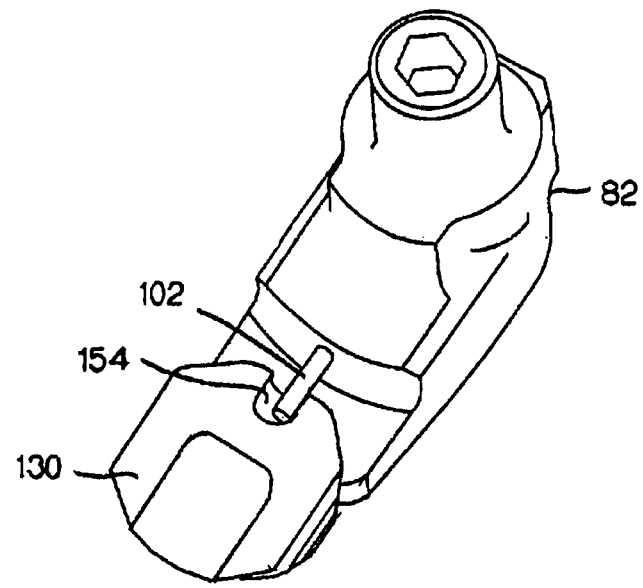
FIG. 17 is an isometric view from bottom of the clamp and diverter plate of the specific embodiment of FIG. 16.
Figure 18:
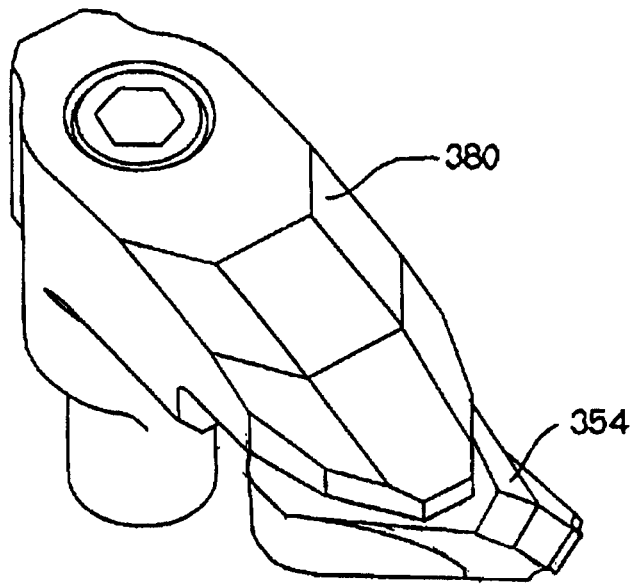
FIG. 18 is an isometric view from top of the clamp and diverter plate of the specific embodiment of FIG. 9.
Figure 19:
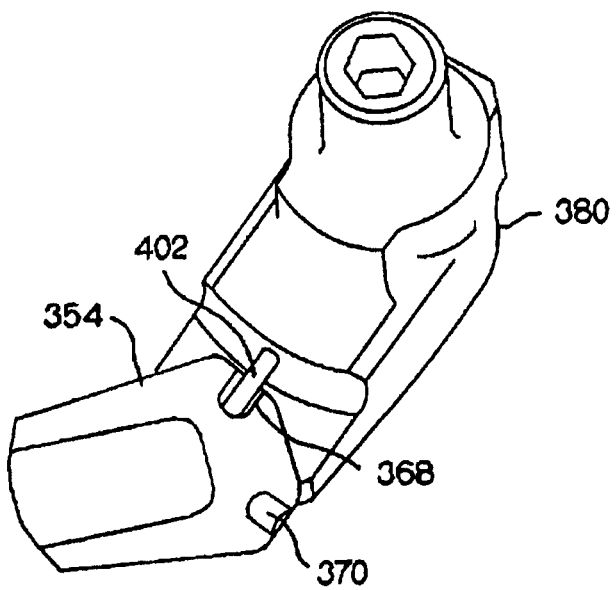
FIG. 19 is an isometric view from bottom of the clamp and diverter plate of the specific embodiment of FIG. 18.

The coolant plates (130, 220, 326) can have different orientations relative to the clamp 82 depending upon the structure and positioning of the coolant plates. For example, referring to FIGS. 16 and 17, coolant plate 130 contains only a single rearward post notch 154 so that when assembly to the clamp 82, the clamp post 102 only can be received by the rearward post notch 154, and thus, the first specific embodiment coolant plate 130 can only exhibit one position relative to the clamp 82, and that is where the central longitudinal axis A-A of the coolant plate 130 is parallel to (and essentially coaxial with) the central longitudinal axis P-P of the clamp arm 96 of the clamp 82. In the case of the third specific embodiment coolant plate 220, the clamp post 102 may be received either by the first rearward post notch 242 or the second rearward post notch 248. In either one of these orientations, the central longitudinal axis G-G of the coolant plate 220 will be disposed at angle W from the central longitudinal axis P-P of the clamp arm 96 of the clamp 82. As one can appreciate, the ability to vary the orientation of the coolant pate relative to the clamp provides advantages.

In the case of the fifth specific embodiment coolant plate 326, the clamp post 102 may be received in any one of the first rearward post notch 340, the second rearward post notch 342. As is apparent from FIG. 8A, each of the rearward post notches (340, 342) exhibits a different orientation relative to the central longitudinal axis O-O of the coolant plate 326, and hence, would exhibit a different orientation with respect to the central longitudinal axis P-P of the clamp arm 96 of the clamp 82. When the clamp post 102 is within the first rearward post notch 340, the coolant plate 326 has an orientation such that the central longitudinal axis O-O there of is disposed at an angle Y/ 2 with the central longitudinal axis P-P of the clamp arm 96 of the clamp 82. When the clamp post 102 is within the second rearward post notch 342, the coolant plate 326 has an orientation such that the central longitudinal axis O-O there of is disposed at an angle Y/ 2 with the central longitudinal axis P-P of the clamp arm 96 of the clamp 82. As one can appreciate, the ability to vary the orientation of the coolant plate relative to the clamp provides advantages.

The second specific embodiment of the clamp 380 has a clamp projection 398 in the form of a rib. The rib-style of clamp projection 398 is intended to engage a selected one of the recesses in the form of a trough in the top plate surface of the specific coolant plate. The specific coolant plates designed to cooperate with the second embodiment of the clamp 380 comprise the second specific embodiment coolant plate 170, the fourth specific embodiment coolant plate 270, and the sixth specific embodiment coolant plate 354. As will become apparent, there is a correspondence between the rearward post notch that receives the clamp post 402 and the recess that receives the rib-style clamp projection 398 of the clamp 380.

In reference to the second specific embodiment coolant plate 170 as illustrated in FIGS. 4-4B, when the clamp 380 is assembly to the coolant plate 170, the rib-style projection 398 is received within the recess 180 and the clamp post 402 is received within the rearward post notch 200. In this orientation, the clamp 380 is in generally parallel alignment with the coolant plate 370. In other words, the central longitudinal axis QQ-QQ of the clamp 380 is generally parallel to the central longitudinal axis C-C of coolant plate 170.

In reference to the fourth specific embodiment coolant plate 270 as illustrated in FIGS. 7-7C, when the clamp 380 is assembly to the coolant plate 270, the rib-style projection 398 can be selectively received within either recess 280 or recess 282. When the rib-style projection 398 is in recess 280, the clamp post 402 is received in the rearward post notch 306. When the rib-style projection 398 is in recess 282, the clamp post 402 is received in the rearward post notch 300. As is apparent, the orientation of the coolant plate 270 relative to the clamp 380 is different depending upon the recess ad the rearward post notch engaged by the rib-style projection 398 and the clamp post 402.

In reference to the sixth specific embodiment coolant plate 354, referring to FIGS. 9-9A, when the clamp 380 is assembled to the coolant plate 354, the rib-style projection 398 can be selectively received within either recess 364 or recess 366. When the rib-style projection 398 is in recess 364, the clamp post 402 is received in the rearward post notch 370. When the rib-style projection 398 is in recess 366, the clamp post 402 is received in the rearward post notch 368. As is apparent, the orientation of the coolant plate 354 relative to the clamp 380 is different depending upon the recess and the rearward post notch engaged by the rib-style projection 398 and the clamp post 402.

There should be an appreciation that the clamp post 102 of the clamp 82 and the clamp post 402 of the clamp 380 are positioners that maintain the position of the clamp (82, 380) to the corresponding coolant plate upon assembly of the clamp and the coolant plate. In this regard, the clamp post is received within the corresponding notch in the coolant plate thereby maintaining the relative position or orientation of the clamp and the coolant plate.

Figure 20:
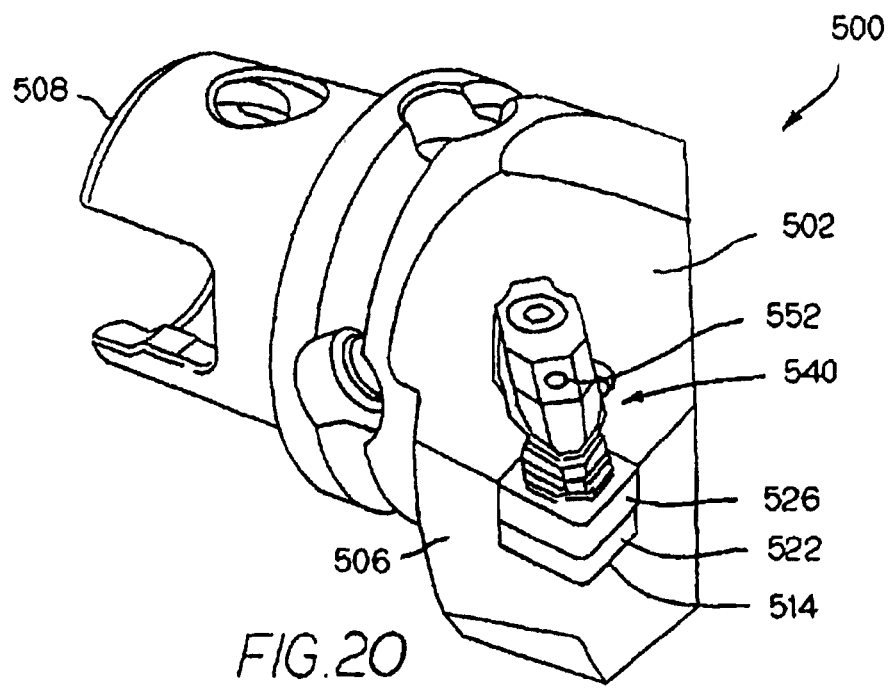
FIG. 20 is an isometric view of a specific embodiment of a cutting tool assembly.
Figure 26:
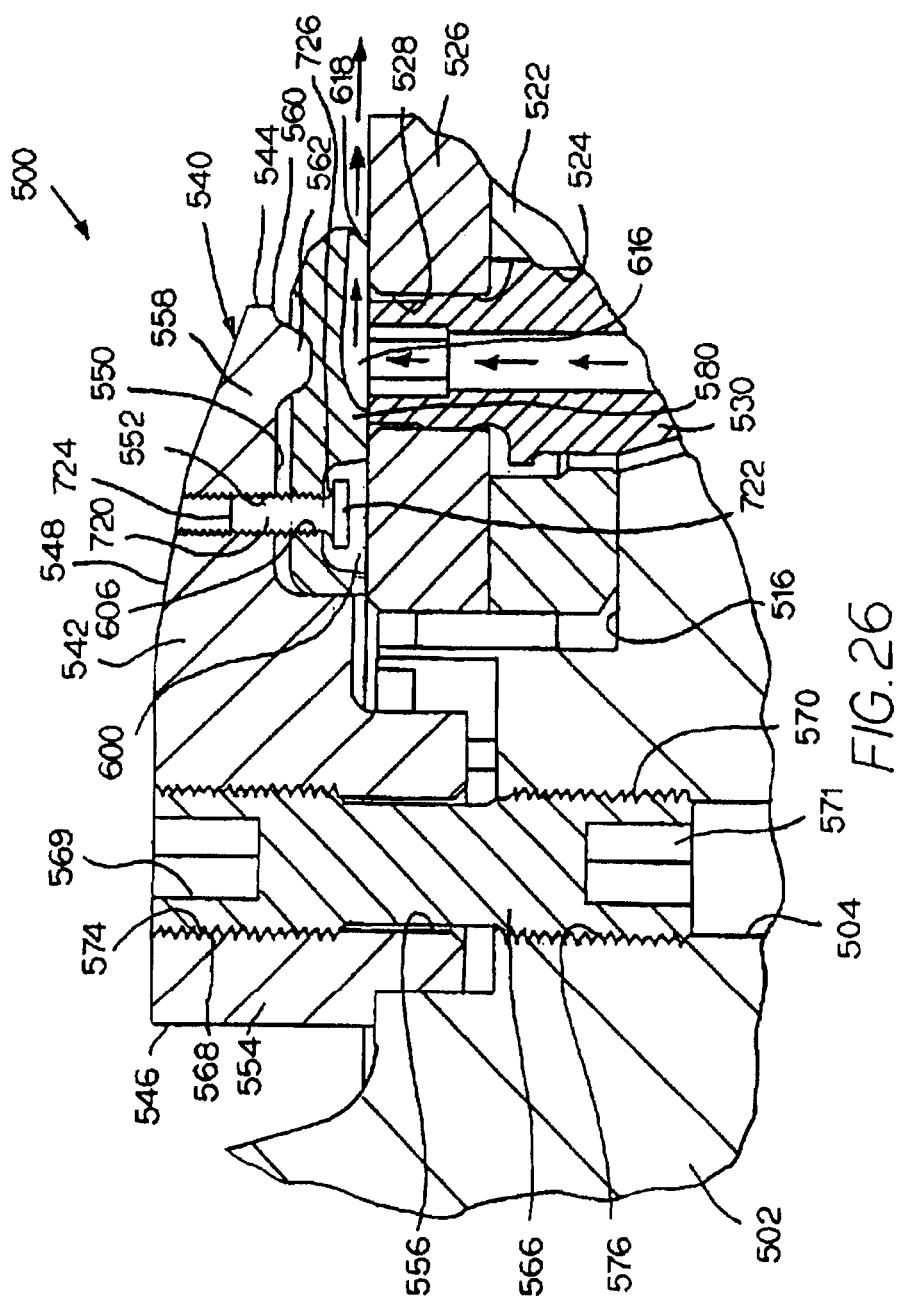
FIG. 26 is a cross-sectional view of the cutting tool assembly of FIG. 20.

Referring to the drawings, FIGS. 20 and 26 show another specific embodiment of a cutting tool assembly generally designated as 500. Cutting tool assembly 500 functions in basically the same way to effectively deliver coolant to the cutting insert-workpiece interface as do the cutting tool assemblies 20 and 410. While it will be described in more detail hereinafter, the same is true for the cutting tool assembly 622 in that it functions in basically the same way to deliver coolant to the cutting insert-workpiece interface as do the cutting tool assemblies 20 and 410.

The significant structural differences between the cutting tool assemblies 20 and 410 and cutting tool assemblies 500 and 622 resides in the way the coolant plate connects or assembles to the clamping member. In cutting tool assemblies 20 and 410, a post from the clamping member engages or registers within a notch in the coolant plate to maintain the relative position between the coolant plate and the clamping member. In cutting tool assemblies 500 and 622, a threaded screw (or threaded member) threadedly engages an aperture (or threaded aperture) in the coolant plate, which does not contain a notch, and an aperture (or threaded aperture) in the clamping member, which does not contain a post, to secure the coolant plate to the clamping member and maintain the relative position of the coolant plate to the clamping member. The coolant plate with the aperture is longer than the coolant plate with the notch.

FIG. 26 illustrates only a part of the structure of the cutting tool assembly 500 in comparison to the structure of the cutting tool assembly 20 illustrated in FIG. 3. It should be understood that the structure not illustrated in FIG. 26 is similar to corresponding structure illustrated in FIG. 3.

Cutting tool assembly 500 comprises a holder 502 that has a clamp bore 504. Holder 502 further has a forward end 506 and a rearward end 508. Along the lines of holder 22, holder 502 contains a coolant passage that has an entrance and an exit. Holder 502 further has a seat 514 which exhibits a seating surface 516. Holder 502 contains a seat bore with a threaded portion. Cutting tool assembly 500 further includes a shim 522 that contains a central aperture 524 and a cutting insert 526 that contains a central aperture 528. Cutting tool assembly 500 also includes a locking pin 530 that has a structure and function similar to the locking pin 60 described hereinabove.

Figure 21:
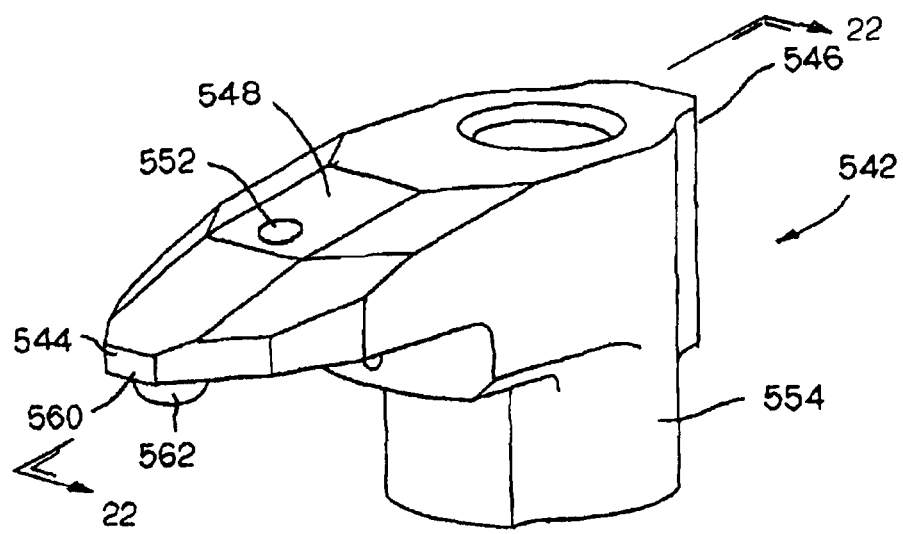
FIG. 21 is an isometric view of a specific embodiment of a clamp member.
Figure 22:
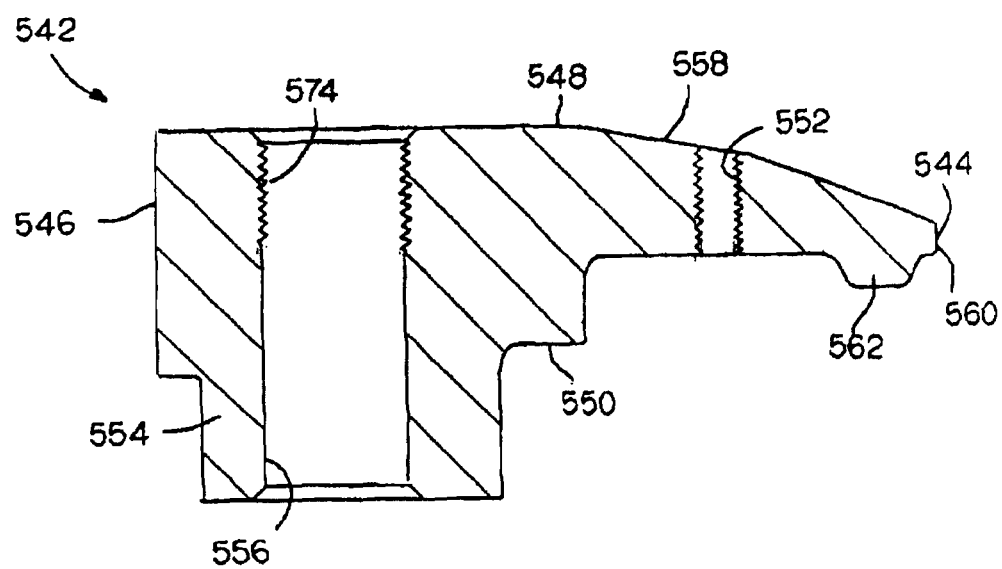
FIG. 22 is a cross-sectional view of the clamp member of FIG. 21 taken along section line 22-22 of FIG. 21.

Still referring to FIGS. 20 and 26, as well as FIGS. 21-22, cutting tool assembly 500 further includes a specific embodiment of a clamp assembly 540. Clamp assembly 540 includes a clamp member 542 which has a forward end 544, a rearward end 546, a top surface 548 and a bottom surface 550. Clamp member 542 contains a threaded aperture 552. As will be described hereinafter, the threaded aperture 552 receives a threaded screw 720, which has a screw head 722, which functions to secure together the clamp member 542 and the coolant plate 580, which is described in more detail hereinafter.

Clamp member 542 has a clamp base portion 554, which contains a cylindrical bore 556. Clamp member 542 has a clamp arm 558, which has a distal end 560. There is a clamp projection 562 in the form of a boss depending from the adjacent distal end 560 of the clamp arm 558. As will be described in more detail hereinafter, the boss or clamp projection 562 engages the recess 590 in the coolant plate 580 when the coolant plate 580 and clamp member 542 are assembled together.

The clamp assembly 540 further includes a threaded member 566 that has an upper threaded portion 568 with a socket 569 and a lower threaded section 570 with a socket 571. Cylindrical bore 556 has a threaded section 574. Clamp bore 504 has a threaded section 576. The upper threaded section 568 of the threaded member 566 threadedly engages the threaded upper section 574 of the bore 556. The lower threaded section 570 of the threaded member 566 threadedly engages the threaded section 576 of the clamp bore 504, which is in the holder 502. The threaded member 566 securely fastens the clamp 542 to the holder 502 when the coolant plate 580 is attached so as to then exert a force or bias against the cutting insert 526 and the shim 522.

Figure 23:
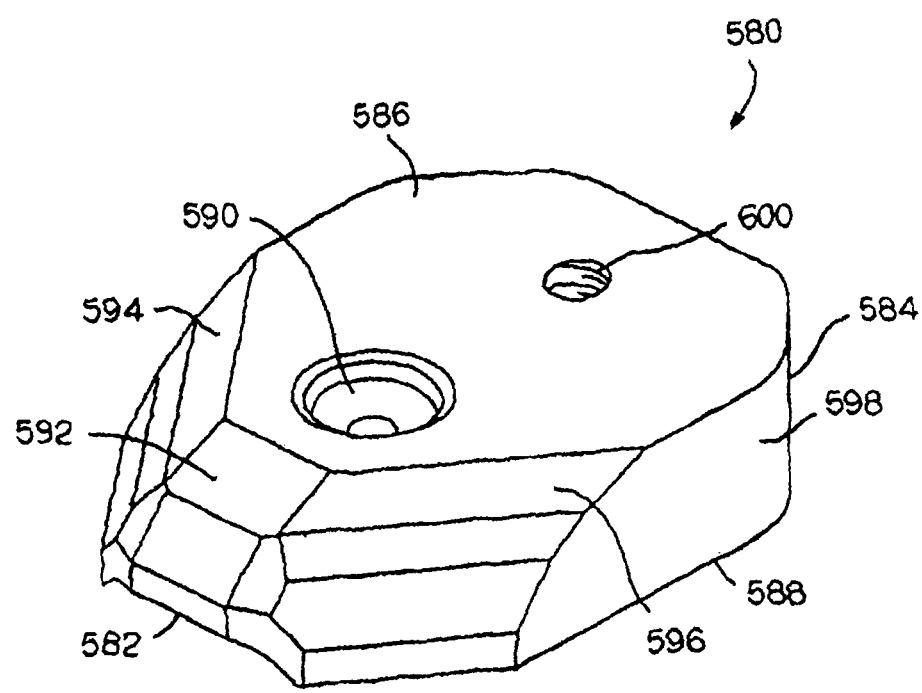
FIG. 23 is an isometric view of a specific embodiment of a coolant plate for use with the cutting tool assembly of FIG. 20.

Referring to FIGS. 23-25, there is shown a specific embodiment of a coolant plate generally designated as 580 wherein the coolant plate 580 is intended to be connected to the clamp member 542. Coolant plate 580 has a forward end 582, a rearward end 584, a top plate surface 586 and a bottom plate surface 588. The top plate surface 586 contains a recess 590, which is in the form of a circular depression. The geometry or profile of the recess 590 cooperates with the clamp projection (or boss) 562 to help maintain the position of the coolant plate 580 relative to the clamp member 542. Coolant plate 580 has a sloped forward surface region 592, swept-back opposite side surface regions 594, 596 and a generally U-shaped rear surface region 598 that extends between the opposite side surface regions 594, 596. The bottom plate surface 588 of the coolant plate 580 contains a bowl 616 that has an open end 618 and a closed end 620. The coolant plate 580 has a central longitudinal axis A'-A'.

Coolant plate 580 further contains an aperture 600 that extends between the top plate surface 586 and the bottom plate surface 588 wherein aperture 600 has a top end 602 adjacent the top plate surface 586 and a bottom end 604 adjacent the bottom plate surface 588. Aperture 600 has a cylindrically-shaped reduced dimension section 606 that is threaded. Aperture 600 further has a dome-shaped enlarged dimension section 608 with an arcuate top surface 610 and a generally cylindrical (or frusto-conical) side surface 612.

As previously mentioned, the coolant plate 580 and the clamp member 542 are intended to function together. In this regard, the threaded screw 720 (see FIG. 26) is received in the aperture 600 and engages the reduced dimension threaded section 606. The threaded screw 720 also threadedly engages the threaded aperture 552 in the clamping member 542. The threaded screw 720 is tightened to a position so as to secure the coolant plate 580 to the clamping member 542. As illustrated in FIG. 3, the distal end 724 of the treaded screw 720 terminates within the volume of the threaded aperture 552. Typically, there is a gap or space 726 between the underside surface of the head 722 of the screw 720 and the arcuate top surface 610 of the dome-shaped enlarged dimension section 608 of the aperture 600. After the coolant plate 580 is secured to the clamp member 542, the clamp assembly 540 can then be secured to the holder 502.

Referring back to FIG. 26, in operation, coolant, which is typically under pressure, passes through the coolant passage so as to exit the coolant passage at the exit thereof. As shown by the arrows, coolant flows through the central longitudinal bore of the locking pin 530. Coolant enters into the volume defined by the bowl 616 in the coolant plate 580 and impinges the surfaces that define the bowl 616 so that coolant is directed so as to exit out of the open end 618 of the bowl 616. The coolant travels toward the interface between the cutting insert 526 and the workpiece.

The capability to provide adequate coolant flow to the interface between the cutting insert and the workpiece has advantages. For example, a chip generated from the workpiece can sometimes stick (e.g., through welding) to the surface of the cutting insert. The build up of chip material on the cutting insert in this fashion is an undesirable occurrence that can negatively impact upon the performance of the cutting insert, and hence, the overall material removal operation. A flow of coolant to the insert-chip interface will reduce the potential for such welding. It would therefore be desirable to reduce excessive heat at the insert-chip interface to eliminate or reduce build up of chip material. Further, in a chipforming material removal operation, there can occur instances in which the chips do not exit the region of the insert-chip interface when the chip sticks to the cutting insert. When a chip does not exit the region of the insert-chip interface, there is the potential that a chip can be re-cut. It is undesirable for the milling insert to re-cut a chip already removed from the workpiece. A flow of coolant to the insert-chip interface will facilitate the evacuation of chips from the insert-chip interface thereby minimizing the potential that a chip will be re-cut. In addition, it is undesirable for the chip to become long. Breaking of the chip into smaller pieces is a desirable event during the material removal operation. The coolant stream can impinge the chip to thereby break the chip into the smaller pieces.

Figure 27:
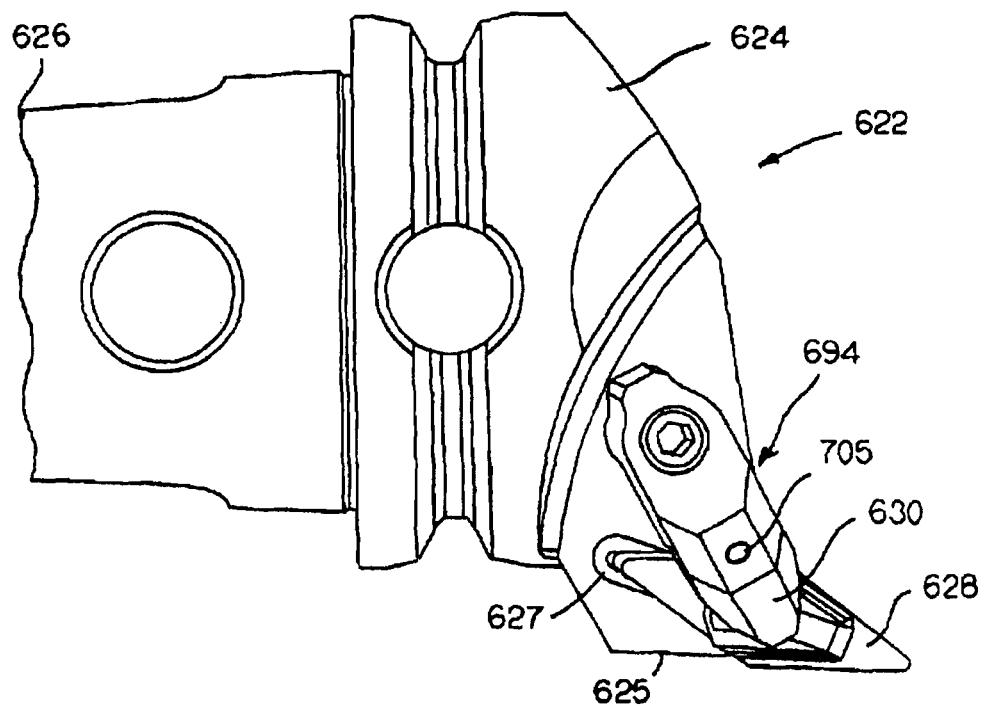
FIG. 27 is an isometric view of a specific embodiment of a cutting tool assembly.

Referring to FIG. 27, there is shown another specific embodiment of a cutting tool assembly generally designated as 622. Cutting tool assembly 622 includes a holder 624 that has a forward end 625 and a rearward end 626. The holder 624 contains a seat 627 adjacent to the forward end 625. The seat 627 receives a cutting insert 628 and shim (not illustrated).

Figure 31:
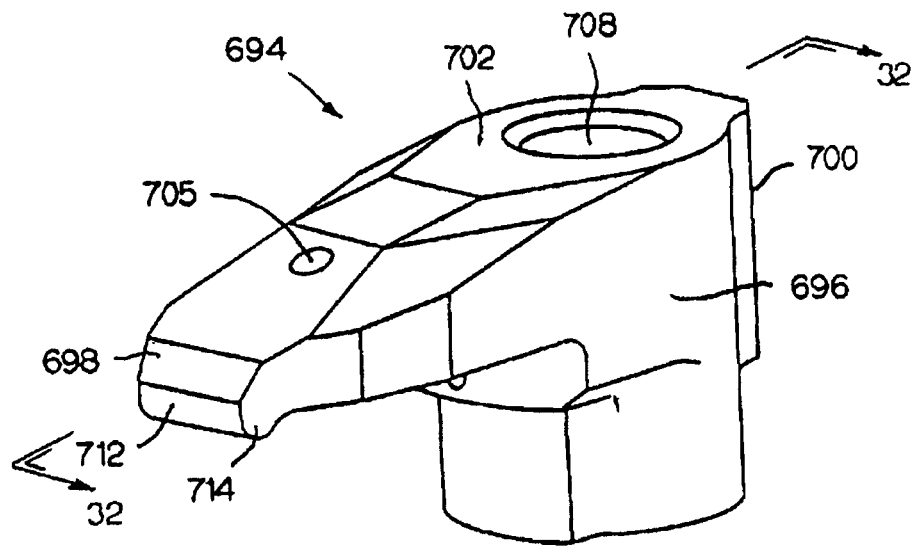
FIG. 31 is an isometric view of a specific embodiment of a clamp member to be used with the cutting tool assembly of FIG. 27.
Figure 32:
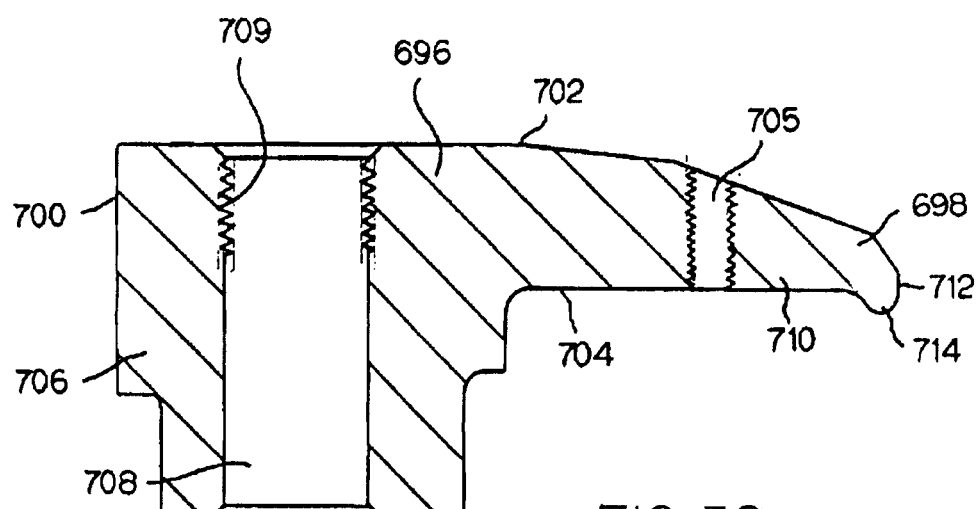
FIG. 32 is a cross-sectional view of the clamp member of FIG. 31 taken along section line 32-32 of FIG. 31.

Referring to FIGS. 31 and 32, there is shown a specific embodiment of a clamp assembly generally designated as 694 that includes a clamp 696. Clamp member 696 has a forward end 698, a rearward end 700, a top clamp surface 702 and a bottom clamp surface 704. Clamp member 696 contains a threaded aperture 705. Clamp member 696 has a clamp base 706 that contains a cylindrical bore 708. Cylindrical bore 708 has an upper threaded section 709 with the remainder of the cylindrical bore 708 being smooth. Clamp member 696 further has an arm 710 with a distal end 712 wherein a clamp projection in the form of a rib 714 projects there from.

Figure 28:
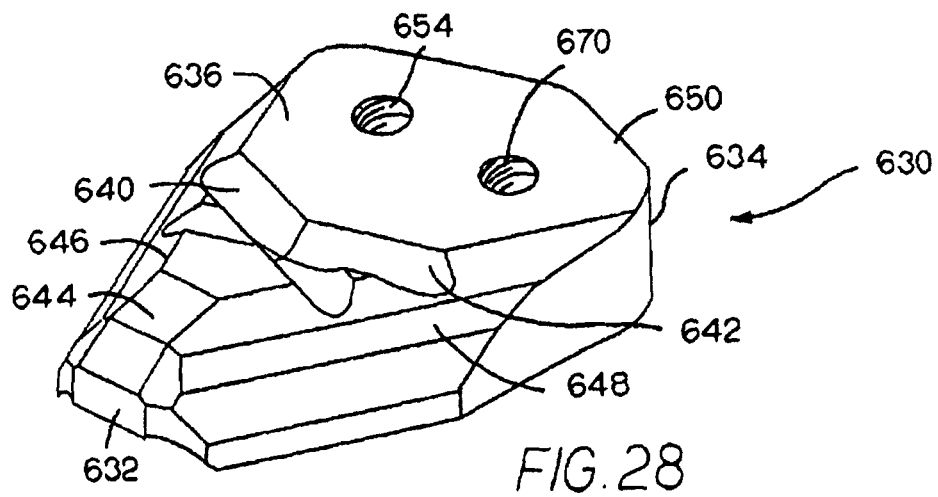
FIG. 28 is an isometric view of a specific embodiment of a coolant plate to be used in the cutting tool assembly of FIG. 27.
Figure 29:
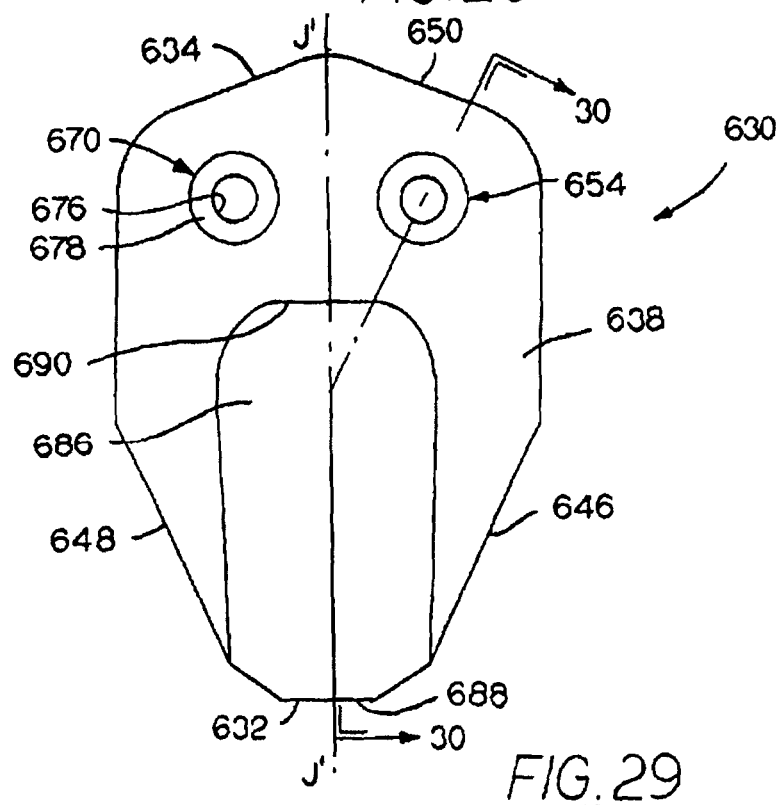
FIG. 29 is a bottom view of the coolant plate of FIG. 28.
Figure 30:
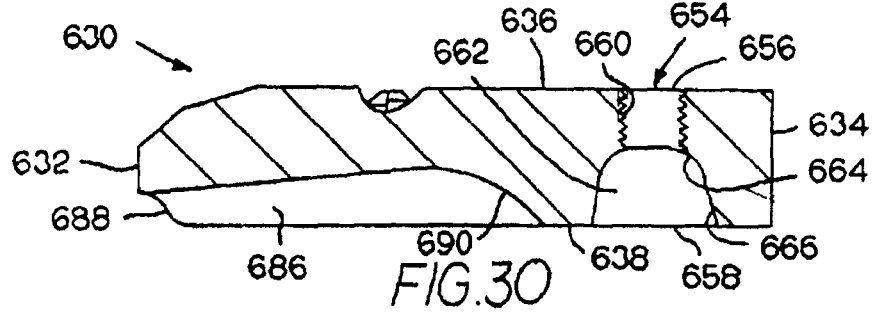
FIG. 30 is a cross-sectional view of the coolant plate of FIG. 28 taken along section line 30-30 of FIG. 29.

Referring to FIGS. 28, 29 and 30, there is shown another specific embodiment of a coolant plate generally designated as 630. Coolant plate 630 has a central longitudinal axis J'-J'. Coolant plate 630 has a forward end 632, a rearward end 634, a top plate surface 636, and a bottom plate surface 638. The top plate surface 636 contains a pair of intersecting recesses 640, 642. Referring to FIG. 28, one recess 640 is in the form of an elongate trough and the other recess 642 is in the form of an elongate trough. These elongate troughs (640, 642) have an orientation relative to each other and the transverse axis of coolant plate 630 that is like corresponding orientations of the elongate troughs 280, 282 of coolant plate 270 in FIG. 7. The angles of disposition of the recesses 640, 624 are the same as those of the recesses 280, 282 of coolant plate 270. Coolant plate 630 has a sloped forward surface region 644, swept-back opposite side surface regions 646, 648, and a generally U-shaped rear surface region 650 extending between the opposite side surface regions 646, 648.

Coolant plate 630 further contains a pair of spaced apart apertures 654 and 670. As will be described hereinafter, the operator can select which aperture (654, 670) to use wherein the threaded screw engages the selected threaded aperture (654, 670) in the coolant plate 630 and the threaded aperture 705 in the clamp member 696 so as to function to tightly secure together the clamp member 696 and the coolant plate 630 at a selected one of two possible orientations of the coolant plate 630 relative to the clamp member 696.

Referring to FIG. 30, aperture 654 extends between the top plate surface 636 and the bottom plate surface 638 wherein aperture 654 has a top end 656 adjacent the top plate surface 636 and a bottom end 658 adjacent the bottom plate surface 638. Aperture 654 has a generally cylindrically-shaped reduced dimension section 660 that is threaded. Aperture 654 further has a dome-shaped enlarged dimension section 662 with an arcuate top surface 664 and a generally cylindrical or generally frusto-conical side surface 666. The geometry of aperture 670 is the same as the geometry of aperture 654. Aperture 670 extends between the top plate surface 636 and the bottom plate surface 638 wherein aperture 670 has a top end adjacent the top plate surface 636 and a bottom end adjacent the bottom plate surface 638. Aperture 670 has a cylindrically-shaped reduced dimension section 676 that is threaded. Aperture 670 further has a dome-shaped enlarged dimension section 678 with an arcuate top surface and a cylindrical side surface.

The bottom plate surface 638 of the coolant plate 630 contains a bowl 686 that has an open end 688 and a closed end 690. As described above, coolant travels into the bowl 686 and impinges the surfaces defining the bowl 686 whereby coolant exits the bowl 686 via the open end 688 thereof.

As previously mentioned, the coolant plate 630 and the clamp member 696 are intended to function together. In this regard, a threaded screw is received in the selected one of the aperture 654 or aperture 670 and engages the reduced dimension threaded section (660, 676). The threaded screw also threadedly engages the threaded aperture 705 in the clamping member 696. The threaded screw is tightened to a position so as to secure the coolant plate 630 to the clamping member 696. Typically, there is a gap or space between the underside surface of the head of the screw and the arcuate top surface of the dome-shaped enlarged dimension section of the selected aperture. The clamp assembly 694 can then be secured to the holder 624.

There should be an appreciation that the threaded member (threaded screw 720) is a positioner that maintains the position of the clamp member (542, 696) relative to the corresponding coolant plate upon assembly of the clamp member and the coolant plate. In this regard, the threaded screw threadedly engages the threaded aperture in the clamp member and threadedly engages the threaded aperture in the coolant plate thereby maintaining the relative position or orientation of the clamp member and the coolant plate. Further, the engagement of the threaded screw 720 in the corresponding threaded apertures of the clamp member and coolant plate secures together the clamp member and coolant plate.

It is apparent that the present invention provides a clamping assembly of a clamp and coolant plate that exhibits a geometry so as to accommodate a number of different clamps and coolant plates without having to keep in inventory a variety of different cutting inserts. A reduction in the number of different clamps and/or coolant plates in inventory would result in a cost savings thereby increasing the overall efficiency of the cutting operation.

Further, it is apparent that the present invention provides for adequate coolant flow to the interface between the cutting insert and the workpiece. The capability to provide adequate coolant flow to the interface between the cutting insert and the workpiece has advantages. For example, a chip generated from the workpiece can sometimes stick (e.g., through welding) to the surface of the cutting insert. The build up of chip material on the cutting insert in this fashion is an undesirable occurrence that can negatively impact upon the performance of the cutting insert, and hence, the overall material removal operation. A flow of coolant to the insert-chip interface will reduce the potential for such welding. It would therefore be desirable to reduce excessive heat at the insert-chip interface to eliminate or reduce build up of chip material. Further, in a chipforming material removal operation, there can occur instances in which the chips do not exit the region of the insert-chip interface when the chip sticks to the cutting insert. When a chip does not exit the region of the insert-chip interface, there is the potential that a chip can be re-cut. It is undesirable for the turning insert to re-cut a chip already removed from the workpiece. A flow of coolant to the insert-chip interface will facilitate the evacuation of chips from the insert-chip interface thereby minimizing the potential that a chip will be re-cut. In addition, it is undesirable for the chip to become long. Breaking of the chip into smaller pieces is a desirable event during the material removal operation. The coolant stream can impinge the chip to thereby break the chip into the smaller pieces.

The patents and other documents identified herein are hereby incorporated by reference herein. Other embodiments of the invention will be apparent to those skilled in the art from a consideration of the specification or a practice of the invention disclosed herein. It is intended that the specification and examples are illustrative only and are not intended to be limiting on the scope of the invention. The true scope and spirit of the invention is indicated by the following claims.

What is claimed is:

1. A clamp assembly to secure a cutting insert to a holder, the clamp assembly comprising:
   a clamp;
   the clamp having a distal end and a clamp projection depending from the distal end of the clamp;
   a coolant plate having a top plate surface and a bottom plate surface, the top plate surface containing a recess wherein the recess receives the clamp projection upon assembly of the clamp and the coolant plate;
   the bottom plate surface containing a bowl having an open bowl end wherein in operation the bowl directs coolant through the open bowl end toward the cutting insert;
   a positioner extending between the clamp and the coolant plate so as to maintain a position of the clamp relative to the coolant plate upon the assembly of the clamp and the coolant plate; and wherein the recess comprises a depression.

2. The clamp assembly according to claim 1 wherein the clamp projection comprising a boss.

3. The clamp assembly according to claim 1 wherein the recess comprising a first notch, wherein the first notch having a first notch central longitudinal axis, and the coolant plate having a coolant plate central longitudinal axis, and wherein the first notch central longitudinal axis being generally parallel to the coolant plate central longitudinal axis.

4. The clamp assembly according to claim 2 wherein the clamp projection comprising a boss, wherein the recess comprising a first notch, wherein the bottom plate surface containing a rearward notch having a central longitudinal axis, and the first notch having a central longitudinal axis, and the central longitudinal axis of the rearward notch being generally perpendicular to the central longitudinal axis of the first notch.

5. The clamp assembly according to claim 1 wherein the clamp containing a threaded aperture and the coolant plate containing a threaded aperture, and the positioner comprising a threaded member, and the threaded member threadedly engaging the threaded aperture of the clamp and the threaded aperture of the coolant plate so as to maintain a position of the clamp relative to the coolant plate.

6. The clamp assembly according to claim 5 wherein the threaded member secures the coolant plate to the clamp.

7. The clamp assembly according to claim 1, wherein the coolant plate has a central longitudinal axis and the positioner is arranged generally parallel to the central longitudinal axis of the coolant plate.

8. The clamp assembly according to claim 1, wherein the coolant plate has a central longitudinal axis and the positioner is arranged oblique to the central longitudinal axis of the coolant plate.

9. The clamp assembly according to claim 1, wherein the clamp has a central longitudinal axis and the positioner is arranged generally parallel to the central longitudinal axis of the clamp.

\* \* \* \* \*